US011071111B2

(12) United States Patent
Kim et al.

(10) Patent No.: US 11,071,111 B2
(45) Date of Patent: *Jul. 20, 2021

(54) METHOD AND APPARATUS FOR TRANSMITTING AND RECEIVING UE CAPABILITY INFORMATION IN MOBILE COMMUNICATION SYSTEM

(71) Applicant: Samsung Electronics Co., Ltd., Suwon-si (KR)

(72) Inventors: Soenghun Kim, Suwon-si (KR); Kyeongin Jeong, Yongin-si (KR); Sangbum Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/690,783

(22) Filed: Nov. 21, 2019

(65) Prior Publication Data

US 2020/0092886 A1 Mar. 19, 2020

Related U.S. Application Data

(63) Continuation of application No. 16/397,438, filed on Apr. 29, 2019, now Pat. No. 10,674,512, which is a (Continued)

(30) Foreign Application Priority Data

May 9, 2014 (KR) ........................ 10-2014-0055917
May 19, 2014 (KR) ........................ 10-2014-0059819

(51) Int. Cl.
*H04W 72/04* (2009.01)
*H04W 74/00* (2009.01)
(Continued)

(52) U.S. Cl.
CPC ......... *H04W 72/0453* (2013.01); *H04W 8/24* (2013.01); *H04W 72/0413* (2013.01);
(Continued)

(58) Field of Classification Search
None
See application file for complete search history.

(56) References Cited

U.S. PATENT DOCUMENTS 10,674,512 B2 * 6/2020 Kim .................... H04W 74/004
2009/0180408 A1 7/2009 Graybeal et al.
(Continued)

FOREIGN PATENT DOCUMENTS

CN 102006664 A 4/2011
CN 102293046 A 12/2011
(Continued)

OTHER PUBLICATIONS

NTT Docomo et al., Clarification on release independent aspect for TDD-FOO CA, 3GPP TSG-RAN WG4 #70-BIS, R4-141413, Mar. 31-Apr. 3, 2014, pp. 1-2, XP050796564, Sophia-Antipolis Cedex, France.
(Continued)

*Primary Examiner* — Brian S Roberts
(74) *Attorney, Agent, or Firm* — Jefferson IP Law, LLP

(57) ABSTRACT

In order to transmit capability information of a user equipment (UE) to an evolved Node B (eNB), the UE may generate a UE CAPABILITY INFORMATION message including the capability information of the UE, and transmit the generated UE CAPABILITY INFORMATION message to the eNB. Here, the capability information of the UE may include at least one band combination supported by the UE and whether Time Division Duplexing-Frequency Division Duplexing Carrier Aggregation (TDD-FDD CA) for the band combination is supported.

20 Claims, 14 Drawing Sheets

Related U.S. Application Data continuation of application No. 15/595,362, filed on May 15, 2017, now Pat. No. 10,278,183, which is a continuation of application No. 14/707,205, filed on May 8, 2015, now Pat. No. 9,655,121.

(51) Int. Cl.
*H04W 88/02* (2009.01)
*H04W 88/08* (2009.01)
*H04W 8/24* (2009.01)

(52) U.S. Cl.
CPC ......... *H04W 74/004* (2013.01); *H04W 88/02* (2013.01); *H04W 88/08* (2013.01)

(56) References Cited

U.S. PATENT DOCUMENTS

| | | | | |
|---|---|---|---|---|
| 2010/0113010 | A1* | 5/2010 | Tenny | H04L 47/10 455/423 |
| 2010/0130137 | A1 | 5/2010 | Pelletier et al. | |
| 2010/0317315 | A1* | 12/2010 | Burbidge | H04W 36/0022 455/404.1 |
| 2011/0319069 | A1 | 12/2011 | Li | |
| 2012/0106404 | A1 | 5/2012 | Damnjanovic | |
| 2012/0113866 | A1 | 5/2012 | Tenny et al. | |
| 2012/0155272 | A1 | 6/2012 | Quan et al. | |
| 2012/0184281 | A1* | 7/2012 | Kim | H04W 8/24 455/450 |
| 2012/0207115 | A1 | 8/2012 | Oh | |
| 2013/0114508 | A1 | 5/2013 | Liang | |
| 2013/0142139 | A1 | 6/2013 | Kitazoe et al. | |
| 2013/0163550 | A1 | 6/2013 | Marinier et al. | |
| 2013/0343357 | A1 | 12/2013 | Lindoff et al. | |
| 2014/0248917 | A1 | 9/2014 | Scipone et al. | |

FOREIGN PATENT DOCUMENTS

| | | |
|---|---|---|
| CN | 102300328 A | 12/2011 |
| CN | 103416016 A | 11/2013 |

OTHER PUBLICATIONS

Nsn et al., IoT indication for inter-band TDD CA with different UUDL configuration, 3GPP TSG-RAN2 Meeting #85, R2-140987, Feb. 10-14, 2014, XP050816411, Sophia-Antipolis Cedex, France.
Chinese Office Action dated Jul. 30, 2019, issued in Chinese Application No. 201510232822.7.
European Extended Search Report dated Oct. 7, 2019, issued in European Application No. 19181668.5-1214.
Ericsson et al: "Bandwidth combination sets for intra-band and interbank carrier aggregation", 3GPP Draft; 36101_CR1331 R1_(REL-10)_R4-124834, 3rd Generation Partnership Project (3GPP), Mobile Competence Centre : 650. Route Des Lucioles : F-06921 Sophia-Antipolis Cedex ; France , vol. RAN WG4, no. Qingdao, China; 20120813-20120817 Sep. 2, 2012 (Sep. 2, 2012), XP051633018. Dated Sep. 2, 2012.
3GPP TS 36.331 V12.1.0, 3rd Generation Partnership Project; Technical Specification Group Radio Access Network; Evolved Universal Terrestrial Radio Access (E-UTRA); Radio Resource Control (RRC); Protocol specification (Release 12), Mar. 2014.
CMCC, "Discussion on the design of TDD-FDD carrier aggregation for self-scheduling", 3GPP TSG-RAN WG1 meeting #74bis, Guangzhou, China, Oct. 7-11, 2013, R1-134569, Sep. 28, 2013.
Korean Office Action dated Apr. 21, 2020, issued in Korean Application No. 10-2014-0059819.
3GPP TSG-RAN WG2 meeting #85bis, R2-141494 Mar. 22, 2014.
3GPP TSG-RAN WG4 Meeting #70bis, R4-141283, Apr. 4, 2014.
Korean Office Action dated Oct. 27, 2020, issued in Korean Application No. 10-2014-0059819.

* cited by examiner

IFBL = interFreqBandList
IRBL = interRAT-BandList
IFNG = interFreqNeedForGaps

METHOD AND APPARATUS FOR TRANSMITTING AND RECEIVING UE CAPABILITY INFORMATION IN MOBILE COMMUNICATION SYSTEM

CROSS-REFERENCE TO RELATED APPLICATION(S)

This application is a continuation application of prior application Ser. No. 16/397,438 filed on Apr. 29, 2019, which is a continuation application of prior application Ser. No. 15/595,362, filed on May 15, 2017, which issued as U.S. Pat. No. 10,278,183 on Apr. 30, 2019; which is a continuation application of prior application Ser. No. 14/707,205, filed on May 8, 2015, which issued as U.S. Pat. No. 9,655,121 on May 16, 2017; and which claimed priority under 35 U.S.C. 119(a) to applications filed in the Korean Intellectual Property Office on May 9, 2014 and May 19, 2014, and assigned Serial Nos. 10-2014-0055917 and 10-2014-0059819, respectively, the entire contents of each of which are incorporated herein by reference.

BACKGROUND OF THE INVENTION

1. Field of the Invention

The present invention relates to a method and an apparatus for reporting a capability of a user equipment in a mobile communication system, and more particularly to a method and an apparatus for minimizing an amount of information reported when a capability of a user equipment is reported to a network.

2. Description of the Prior Art

Mobile communication systems have been developed for the purpose of providing communication while securing the mobility of a user. The mobile communication systems have reached the stage where a high speed data communication service can be provided as well as voice communication on the strength of the rapid development of technologies.

Currently, a standardization operation of the 3rd Generation Partnership Project (3GPP) regarding Long Term Evolution (LTE) system is being progressed as one of the next generation mobile communication systems. The LTE system is a technology which implements high speed packet based communication having a transmission rate of a maximum of 100 Mbps faster than a data transmission rate of the conventional 3GPP system. Various new technologies are applied to the recent LTE communication systems while keeping pace with the completion of the LTE standardization, and a discussion on LTE-Advanced (LTE-A) for significantly improving a transmission rate is regularized. Hereinafter, an LTE system refers to an existing LTE system and an LTE-A system.

A representative new technology employed to the LTE-A system is Carrier Aggregation (CA). Carrier aggregation is a technology in which user equipment transmits and receives data using multi-carriers. More particularly, the user equipment transmits and receives data through plural aggregated carriers (generally carriers belonging to an identical base station). In the end, this is identical to a user equipment transmitting and receiving data through plural numbers of cells.

Technologies such as a Multiple Input Multiple Output (MIMO) and the like, as well as the carrier aggregation have been employed to the LTE-A system.

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming and large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the technology and the Big Data processing technology through connection with a cloud server, has emerged. As technology elements, such as "sensing technology", "wired/wireless communication and network infrastructure", "service interface technology", and "security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beam forming, MIMO and array antennas. Application of a cloud Radio Access Network (RAN) as the above-described Big Data processing technology may also be considered to be an example of convergence between the 5G technology and the IoT technology.

SUMMARY OF THE INVENTION

As described above, as the new technologies are introduced into the LTE-A system, a method is required in which capability information on the user equipment related to the technologies is efficiently reported to a base station, so that the base station and the user equipment efficiently perform mobile communication.

In accordance with an aspect of the present invention, there is provided a method of transmitting capability information of a User Equipment (UE) to an evolved Node B (eNB) by the UE, the method including: receiving a first message including information that requests at least one frequency band supported by the UE and at least one radio access capability of the UE from an evolved Node B, eNB; generating a second message including capability information of the UE; and transmitting the second message to the eNB, wherein the capability information includes one or more carrier aggregation, CA, band combination supported by the UE wherein the at least one CA band combination is requested in the first message and includes two downlink frequency bands and one uplink frequency band.

In accordance with another aspect of the present invention, there is provided a method of receiving capability information of a user equipment from a UE by an eNB, the method including: generating a first message including information that requests at least one frequency band supported by a user equipment, UE, and at least one radio access capability of the UE; transmitting the first message to the UE and receiving a second message including capability information of the UE from the UE, wherein the capability information comprises at least one carrier aggregation, CA, band combination supported by the UE, and wherein the at least one CA band combination is requested in the first message and includes two downlink frequency bands and one uplink frequency band.

In accordance with another aspect of the present invention, there is provided a UE for transmitting capability information of the UE to an eNB, the UE including: a transceiver that is configured to transmit and receive signals to and from the eNB; and a controller that is configured to generate to receive a first message including information that requests at least one frequency band supported by the UE and at least one radio access capability of the UE from the eNB, to generate a second message including capability information based on the first message, and to transmit the second message to the eNB, wherein the capability information comprises at least one carrier aggregation, CA, band combination supported by the UE, and wherein the at least one CA band combination is requested in the first message and includes two downlink frequency bands and one uplink frequency band.

In accordance with another aspect of the present invention, there is provided an eNB for receiving capability information of a UE from the UE, the eNB including: a transceiver that is configured to transmit and receive signals to and from the UE; and a controller configured to generate a first message that requests at least one frequency band supported by the UE and at least one radio access capability of the UE, configured to transmit the first message to the UE, and configured to receive, from the UE, a second message including capability information corresponding to the first message wherein the capability information comprises at least one carrier aggregation, CA, band combination supported by the UE, and wherein the at least one CA band combination is requested in the first message and includes two downlink frequency bands and one uplink frequency band.

In embodiments of the present invention, the capability information further comprises at least one other CA band combination including two downlink frequency bands and one uplink frequency band supported by the UE.

In embodiments of the present invention, the capability information further comprises at least one non-CA band supported by the UE.

In embodiments of the present invention, CA band combinations in the capability information, at least in part, are prioritized based on the information included in the first message.

In embodiments of the present invention, the second message further comprises information indicating at least one frequency band supported by the UE.

In embodiments of the present invention, the capability information further comprises at least one other CA band combination including two downlink frequency bands and one uplink frequency band supported by the UE, and the capability information further comprises at least one non-CA band supported by the UE.

In embodiments of the present invention, the second message (also referred to as capability information message or UE capability information message) only comprises part of the entire capability of the UE, wherein a capability including frequency bands at which the UE may communicate or frequency band combinations at which the frequency band combinations may communicate is defined as an entire capability of the UE. In embodiments of the present invention, said part of the entire capability included in the second message is selected such that the entire capability can be determined by the eNB based on said part transmitted by the second message. In embodiments of the present invention, said part of the entire capability included in the second message is determined based on restriction information (also referred to as Capability report restriction information) included in the first message.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF THE EXEMPLARY EMBODIMENTS

Hereinafter, exemplary embodiments of the present invention will be described in detail with reference to the accompanying drawings. Further, in the following description of the present invention, a detailed description of known functions and configurations incorporated herein will be omitted when it where the detailed description is considered not increasing the intellegibility of the subject matter of the present invention. The terms which will be described below are terms defined in consideration of the functions in the present disclosure, and may be different according to users, intentions of the users, or customs. Therefore, the terms should be determined based on the definitions provided in the description with due regard to the description as a whole.

Figure 1:
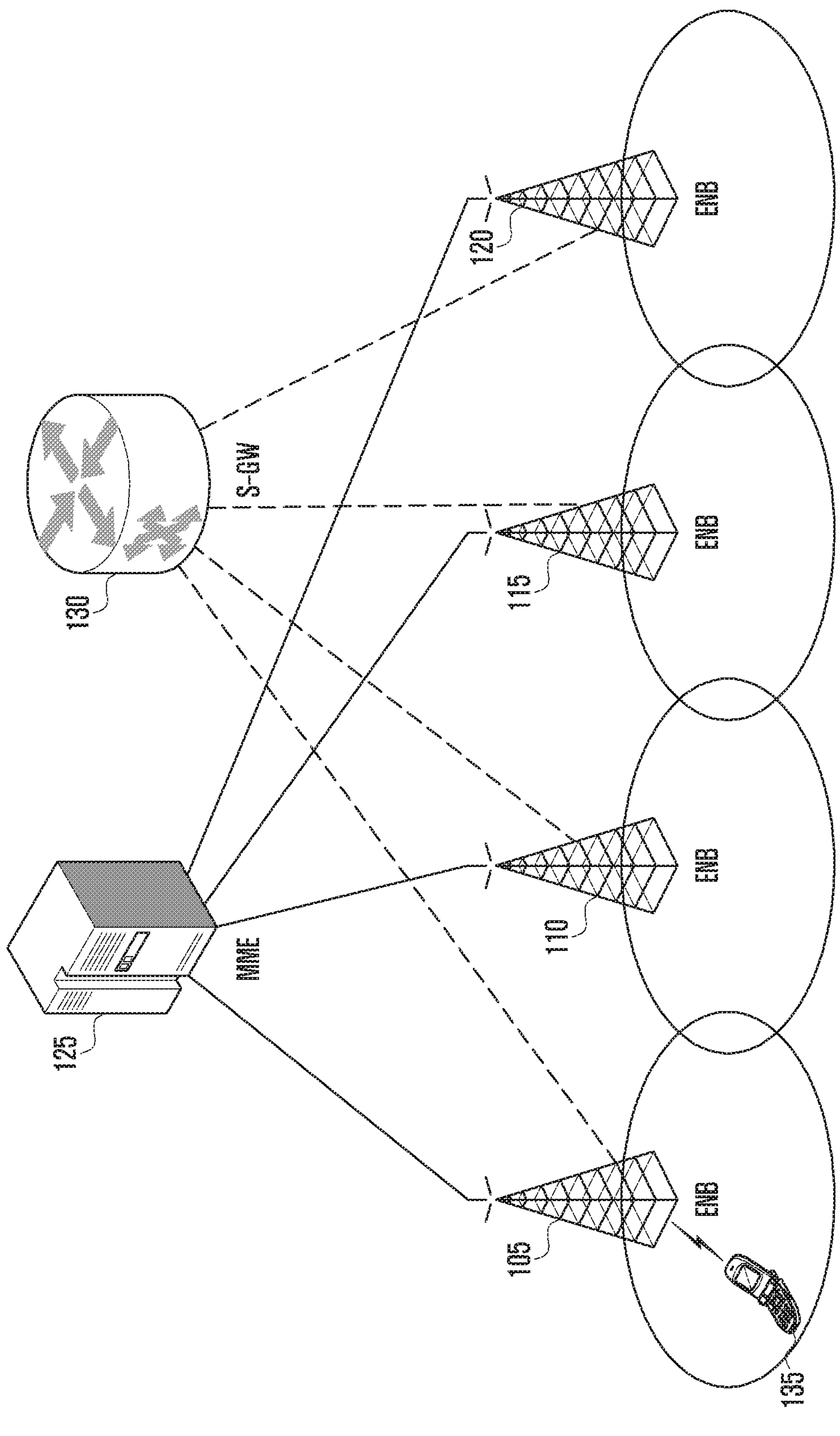
FIG. 1 is a diagram illustrating a structure of an LTE system to which the present invention is applied.

FIG. 1 is a view illustrating a structure of an LTE system to which the present invention is applied. Although an LTE system will be described as an example of a mobile communication system to which the present invention may be applied, the present invention is not limited to such a specific system.

Referring to FIG. 1, a wireless access network of the mobile communication system includes evolved Node Bs (hereinafter, referred to as eNBs, Node Bs, or base stations) 105, 110, 115 and 120, a Mobility Management Entity (MME) 125, and a Serving-Gateway (S-GW) 130. A UE (hereinafter, referred to as a UE or a terminal) 135 accesses an external network (not illustrated) through the eNBs 105, 110, 115, and 120 and the S-GW 130.

The eNBs 105, 110, 115 or 120 corresponds to an existing node B in a Universal Mobile Telecommunication System (UMTS). The eNBs are connected with the UE 135 through a wireless channel, and each eNB performs a more complicated function than that of the existing node B. In the LTE system, because all user traffic including a real time service, for instance through an Internet Protocol (IP) such as a Voice over IP (VoIP), are serviced through a shared channel, an apparatus for collecting and scheduling state information on buffering states of the UEs, a state of available transmission electric power, a channel state and the like is required, and, the eNBs 105, 110, 115 and 120 are responsible for these functions. One eNB generally controls a plurality of cells.

In order to implement a high transmission rate, the LTE system employs Orthogonal Frequency Division Multiplexing (hereinafter, referred to as OFDM) in a 20 MHz bandwidth as a wireless access technology. Furthermore, Adaptive Modulation & Coding (hereinafter, referred to as AMC) through which a modulation scheme and a channel coding rate are determined according to a channel state of the UE is applied.

The S-GW 130 is a device that provides a data bearer, and generates or removes the data bearer under the control of the MME 125. The MME 125 is a device that is responsible for various control functions as well as a mobility management function for the UE, and is connected with a plurality of the eNBs 105, 110, 115 and 120.

Figure 2:
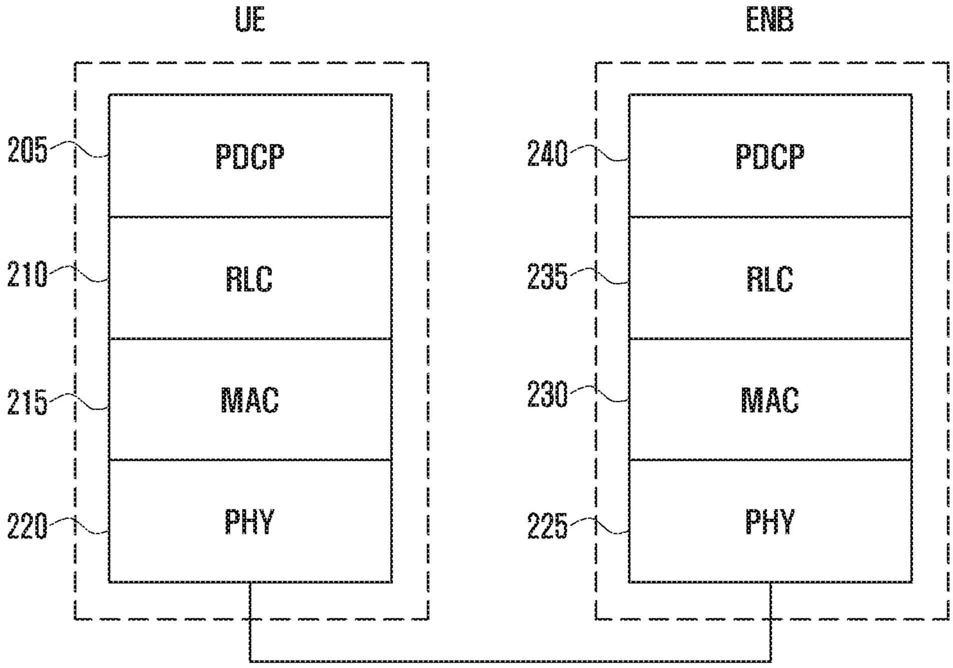
FIG. 2 is a diagram illustrating a structure of a wireless protocol in an LTE system to which the present invention is applied.

FIG. 2 is a view illustrating a structure of a wireless protocol in the LTE system to which the present invention is applied.

Referring to FIG. 2, the UE and the eNB include a Packet Data Convergence Protocol (PDCP) 205 or 240, a Radio Link Control (RLC) 210 or 235 and a Medium Access Control (MAC) 215 or 230, respectively, as the wireless protocol of the LTE system. The PDCPs 205 and 240 are responsible for operations such as compression and restoration of IP headers, and the RLCs 210 and 235 perform an Automatic Retransmission Request (ARQ) operation and the like by reconfiguring a Packet Data Unit or Protocol Data Unit (PDCP or PDU) into a suitable size. The MAC 215 or 230 is connected with various RLC layer devices configured in one UE, and performs an operation of multiplexing RLC PDUs to MAC PDU and demultiplexing the RLC PDUs from the MAC PDU.

A physical layer 220 or 225 channel-codes and modulates higher layer data, generates an OFDM symbol to transmit the OFDM through a radio channel, or is responsible for an operation of demodulating and channel-decoding the OFDM symbol received through the radio channel and to transmit the channel-decoded OFDM symbol to the higher layer, and performs a Hybrid ARQ (HARQ) operation for transmitting and receiving data. In order to support transmission of uplink data, the physical layer 220 or 225 manages a Physical Uplink Shared Channel (PUSCH), a Physical HARQ Indicator Channel (PHICH) that transfers an Acknowledgement (ACK)/Non-Acknowledgement (NACK) corresponding to an HARQ feedback for transmission of a PUSCH, a Physical Downlink Control Channel (PDCCH) that transfers a downlink control signal (for example, scheduling information), and a Physical Uplink Control Channel (PUCCH) that transfers an uplink control signal. The physical layer 220 or 225 may manage the Physical Downlink Shared Channel (PDSCH) in order to support transmission of downlink data.

Figure 3:
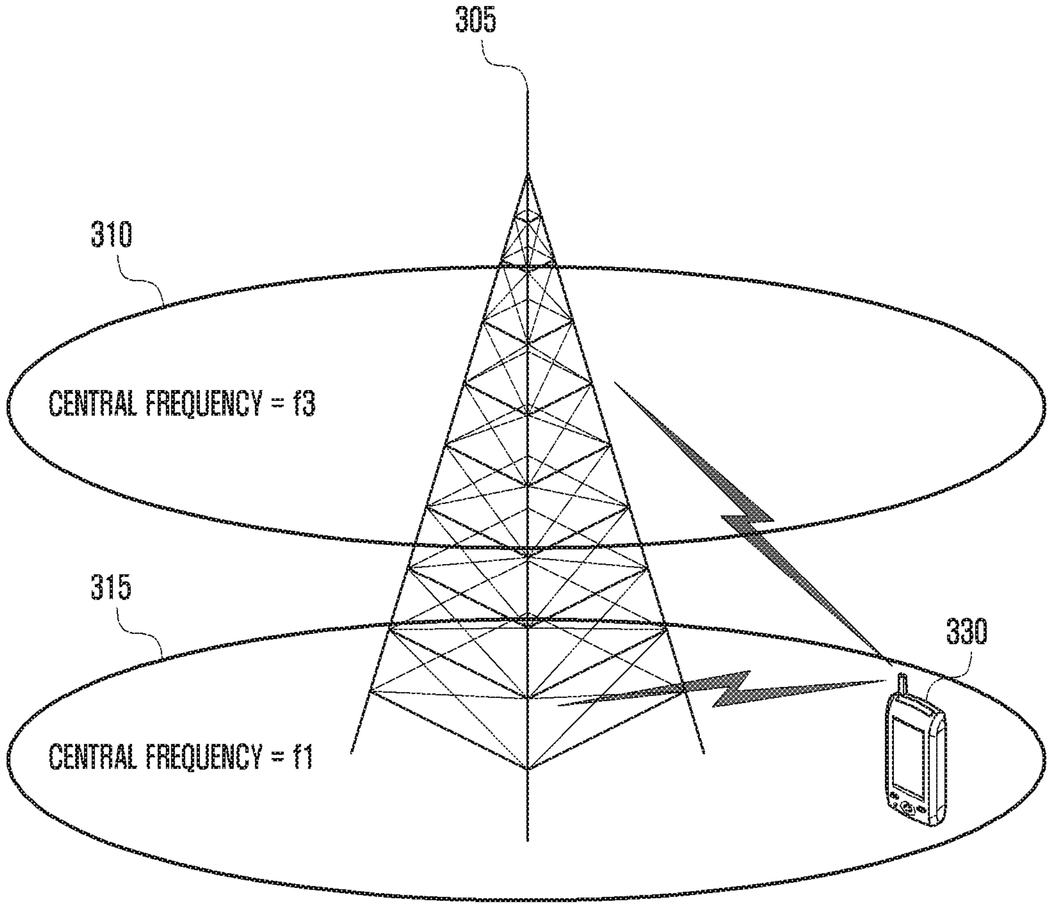
FIG. 3 is a diagram illustrating carrier aggregation in an LTE system to which the present invention is applied.

FIG. 3 is a diagram illustrating carrier aggregation in an LTE system to which the present invention is applied.

Referring to FIG. 3, one eNB generally transmits and receives multiple carriers through various frequency bandwidths. For example, when an eNB 305 transmits a carrier 315, the central frequency of which is f1, and a carrier 310, the central frequency of which is f3, a UE that does not have carrier aggregation capability can transmit and receive data using one of the two carriers 310 and 315. However, a UE 330 having carrier aggregation capability can simultaneously transmit and receive data to/from different carriers 310 and 315. The eNB 305 may allocate more carriers to the UE 330 having the carrier aggregation capability according to circumstances, and then can improve the transmission rate of the UE 330.

It may be understood that the carrier aggregation means that a UE simultaneously transmits and receives data through several cells when one downlink carrier and one uplink carrier which are transmitted and received by one eNB constitute one cell. A maximum data transmission rate increases in proportion to the number of aggregated carriers.

Hereinafter, in the following description of the embodiments of the present disclosure, the reception of the data through the downlink carrier or the transmission of the data through the uplink carrier in the UE has the same meaning as the transmission and reception of the data by using a control channel and a data channel which are provided by a cell corresponding to a center frequency and a frequency band which specify the carrier. In the description, 'Carrier Aggregation (CA)' means that a plurality of serving cells is set in one UE. Hereinafter, an LTE system will be described as an example of the present disclosure for convenience of the description, but the embodiments of the present disclosure may be applicable to all kinds of wireless communication systems supporting the carrier aggregation.

In recent years, a TDD-FDD CA function for aggregating a TDD serving cell and an FDD serving cell have become necessary. The carrier aggregation between the two different duplex modes is a significantly useful function to service providers equipped with both a TDD frequency band and an FDD frequency band, and the number of such providers tends to increase gradually.

A primary cell (PCell) and a secondary cell (SCell) are set in a UE to which carrier aggregation is applied. While the UE and the eNB transmit various uplink control signals (an HARQ feedback, Channel State Information (CSI), and an Scheduling Request (SR) signal) through the PUCCH and maintain a state in which data can be always transmitted and received, the SCell transmits and receives data through the PDSCH and the PUSCH, but the PUCCH is not transmitted but is transited between an enable state and a disable state according to an instruction of the eNB.

In the FDD mode, the HARQ feedback for a PDSCH received from a predetermined sub frame N is transmitted from a sub frame N+4 through the PUCCH of the PCell. In the TDD mode, the HARQ feedback for a PDSCH received from a predetermined sub frame N is transmitted from a sub frame N+k through the PUCCH of the PCell. The k is a value determined according to TDD UL/DL setting, and is defined in Standard 3GPP TS 36.213.

If the PCell of a UE in which the TDD-FDD CA is set is operated in the FDD mode, there is no difficulty in transmitting a HARQ feedback because the PUCCH is present in all sub frames for transmitting an HARQ feedback for the PDSCH received by the TDD SCell to the FDD PCell. Meanwhile, if the PCell is operated in the TDD mode, an original HARQ feedback timing cannot be achieved because the PUCCH is present by only some sub frames due to the attribute of the TDD in transmitting an HARQ feedback for a PDSCH received from the FDD SCell to the TDD PCell. In the case of the TDD PCell, it is necessary to correct an HARQ feedback timing, which means that a new function should be added to a modem of the UE.

In order for the UE to properly operate in a given communication network, information (hereinafter, capability information) related to the capability of the UE should be provided to the network (or at least one specific network node). The capability information may include, for example, information on which feature and frequency the UE supports. As the capability of the UE is advanced and a new function such as carrier aggregation is introduced, complexity and magnitude of the capability information of the UE also increases.

In order to report whether TDD-FDD CA will be supported in a network by an arbitrary UE, the following three types of information elements are necessary:

Which band combination supports TDD-FDD CA?

Is a FDD PCell supported?

Is a TDD PCell supported?

In an embodiment, the present invention suggests a method of signaling the first type of information elements for each band combination, and signaling the second and third types of information elements (hereinafter, a PCell mode capability) for each UE. That is, in one capability report control message, a plurality of first type of information elements are signaled and only one second type of information element and one third type of information element are signaled.

In embodiments of the present invention, the UE reports information on bands supported by the UE and a combination of the bands and defines identifiers for the bands such that the identifiers do not overlap each other for the FDD band and the TDD band (for example, when a band corresponding to frequency bands f1 and f2 is used for the TDD in area A and is used for the FDD in area B, one band indicator for the frequency band is defined for the TDD and one band indicator for the frequency band is defined for the FDD), and thus indicates whether the UE supports the TDD-FDD CA for each combination of bands with reference to the band indicators of the frequency bands reported by the UE. For example, when it is assumed that frequency band indictors 0 to 31 relate to an FDD band and frequency band indicators 32 to 63 relate to a TDD band, the UE supports the TDD-FDD CA for the combination of bands if the UE reports that it supports a combination of band 1 and band 50.

One UE may support the TDD-FDD CA in a plurality of band combinations. Then, although it is not impossible to design the UE such that PCell mode capability (a capability on which duplex mode is supported by the UE in the PCell) may vary for the band combinations, a loss due to an increase in the complexity of the UE is more severe than a gain due to flexibility. According to embodiments of the present invention, the UE applies the same PCell mode capability for all band combinations supported by the TDD-FDD CA, and information regarding the fact is signaled using one frequency band combination regardless of the number of frequency band combinations that support the TDD-FDD CA.

The following are capability information elements that should be reported to a network by a UE supporting carrier aggregation:

Frequency band(s) supported by the UE

Combination(s) of frequency bands supported by the UE

The number of cells that may be aggregated for frequency bands

Maximum bandwidths for frequency bands

The information elements may be mutually combined to express a meaningful capability. For example, the UE reports the following capability information to the network:

aggregating two cells throughout a bandwidth of maximum 20 MHz as a downlink while aggregating two cells throughout a bandwidth of maximum 20 MHz as an uplink in band 1;

aggregating one cell throughout a bandwidth of maximum 10 MHz as an uplink while aggregating two cells throughout a bandwidth of maximum 20 MHz as a downlink in band 1;

aggregating two cells throughout a bandwidth of maximum 20 MHz as a downlink while aggregating one cell throughout a bandwidth of maximum 10 MHz as an uplink in band 1, and aggregating two cells throughout a bandwidth of maximum 20 MHz as a downlink while aggregating two cells throughout maximum 20 MHz as an uplink in band 2; and the like.

The simplest method of reporting the capability information to the network is to explicitly report the information elements one by one. However, because the UE tends to support a larger number of band combinations due to the introduction of new features such as carrier aggregation, the size of the capability information abruptly increases in the above-mentioned report method as the number of band combinations increases. In order to efficiently and accurately report the capability of the UE, the capability information of the UE is preferably abbreviated and reported. To achieve this, the following suggestion may be introduced.

The added bandwidth and the maximum number of cells may be expressed together using a parameter called Bandwidth Class (BWC). As an example, the bandwidth classes may be defined as in Table 1.

TABLE 1

| CA Bandwidth Class | Aggregated Transmission Bandwidth Configuration | Maximum number of Component Carrier (CC) |
|---|---|---|
| A | Added bandwidth = 20 MHz | 1 |
| B | Added bandwidth = 20 MHz | 2 |
| C | 20 MHz < Added bandwidth ≤ 40 MHz | 2 |

For example, the fact that a bandwidth class for a certain frequency band is A means that a maximum of one carrier (or one serving cell) may be set for the frequency band and the total sum of the bandwidths of the serving cells set in the frequency band is a maximum of 20 MHz.

When two or more bandwidth classes are supported in any one frequency band in a frequency band combination, they may be included in the same Information Element (hereinafter, IE). Then, frequency band combination information should be configured such that all combinations of the bandwidth classes recorded in one frequency band combination are supported by a terminal.

First Embodiment

Figure 4:
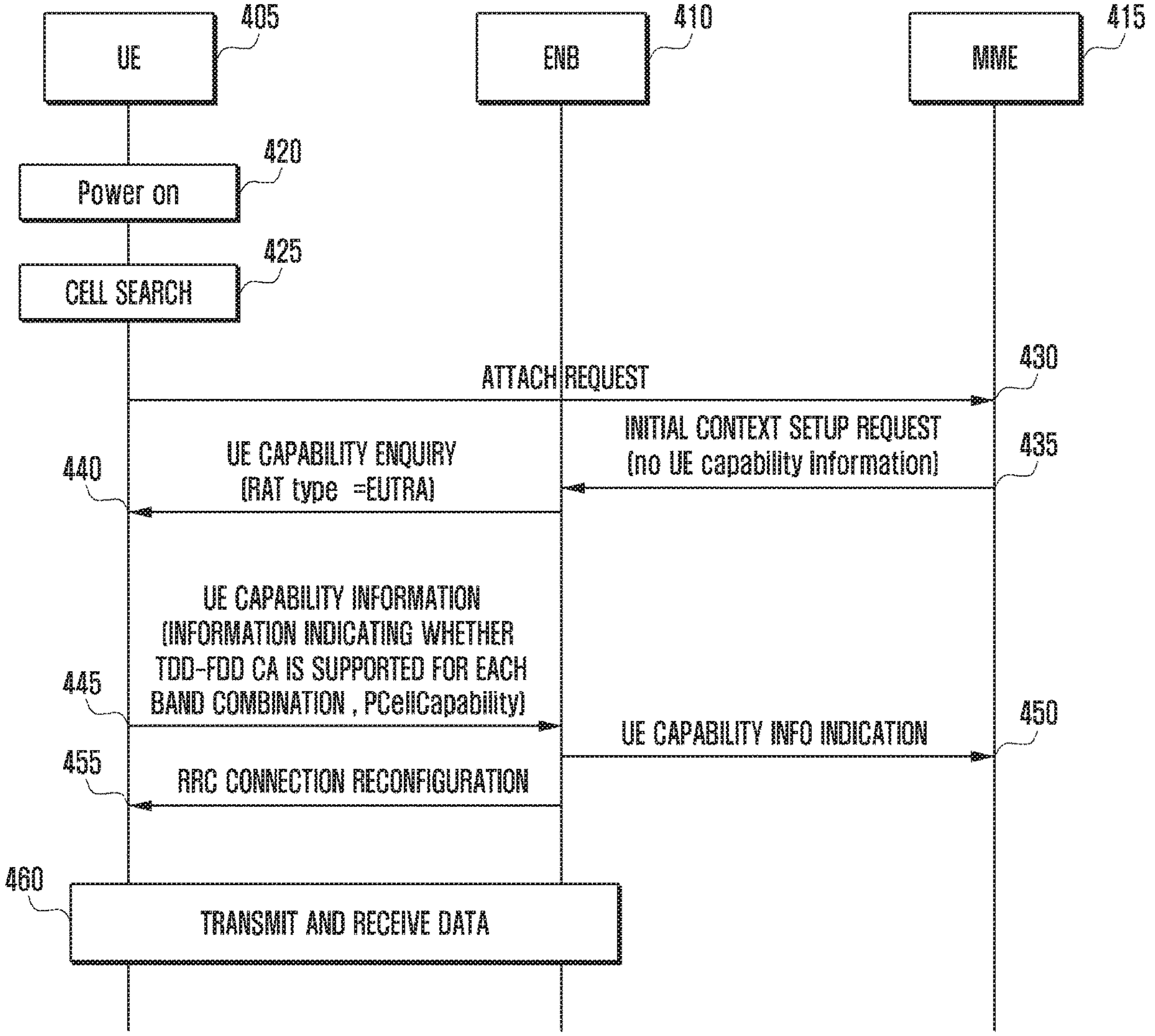
FIG. 4 is a diagram illustrating an operation of an LTE system according to a first embodiment of the present invention.

FIG. 4 is a diagram illustrating an operation of an LTE system according to a first embodiment of the present invention.

A UE is powered, in step 420, on in a mobile communication system including the UE 405, an eNB 410, and an MME 415. The UE searches for a cell that receives electric waves and a PLMN through a cell search process, and determines, in step 425, through which cell of a PLMN a registration process will be performed based on the search result.

After performing a Radio Resource Control (RRC) connection setting process through the selected cell, the UE transmits, in step 430, a control message ATTACH REQUEST that requests registration to the MME. The message includes information such as an identifier of the UE. After the MME determines whether registration of the UE will be allowed if an ATTACH REQUEST message is received, and if it is determined that the registration will be allowed, the MME transmits, in step 435, a control message called an Initial Context Setup Request Message to a serving eNB of the UE. If the MME has capability information of the UE, the message is transmitted while containing capability related information of the UE, but because the MME does not have such information in the initial registration process, the message does not contain UE capability related information. If receiving an Initial Context Setup Request Message that does not include capability information of the UE, the eNB transmits, in step 440, a control message called UE CAPABILITY ENQUIRY to the UE. The message instructs the UE to report capability, and requests capability information for a specific Radio Access Technology (RAT) of the UE using a parameter called RAT Type. If the UE performs the process in an LTE network, the RAT-Type is set to an Evolved Universal Terrestrial Radio Access (EUTRA). The eNB also may request Universal Mobile Telecommunications System (UMTS) related capability information of the UE by adding the UTRA to the RAT-Type for provision against a handover if another wireless network, for example, a UMTS network is present around the eNB. If receiving a UE CAPABILITY ENQUIRY control message, the UE generates UE CAPABILITY INFORMATION in which capability information of the UE for a wireless technology instructed by the RAT Type is recorded. The UE CAPABILITY INFORMATION may include one or more band combination information elements for the band combinations supported by the UE. The band combination information elements are information elements that represent which CA combination is supported, and the eNB may set a suitable CA in the UE using the band combination information elements. The UE CAPABILITY INFORMATION also may include information related to a TDD-FDD CA capability of the UE. The UE transmits, in step 445, the UE CAPABILITY INFORMATION message to the eNB. The eNB transmits, in step 450, a UE CAPABILITY INFO INDICATION message to the MME to report capability information of the UE recorded in the UE CAPABILITY INFORMATION message. The eNB also may properly reset the UE with reference to a traffic situation and a channel situation of the UE based on capability information reported by the UE. For example, the eNB may set, in step 455, an additional SCell in the UE through an RRC CONNECTION RECONFIGURATION message or set a measurement gap while instructing measurement for another frequency to the UE.

In step 460, the eNB and the UE transmit and receive data by applying the setting.

FIGS. 5A to 5D are diagrams illustrating capability information according to a first embodiment of the present invention.

Referring to FIGS. 5A to 5D, the capability information of the UE includes an E-UTRA band information (SupportedBandListEUTRA) 501, information 508 on a band combination supported by the UE, a measurement capability parameter (MeasParameter) 535 of the UE, PCell mode related information (PCellCapability) 530 of the UE, and release information (accessStratumRelease) 507 of the UE.

Figure 5A:
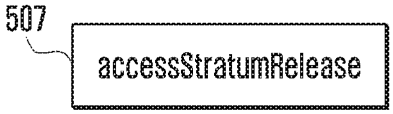
FIGS. 5A to 5D are diagrams illustrating an example of capability information of a UE according to the first embodiment of the present invention.

The release information 507 of the UE in FIG. 5A is information regarding which release of the LTE standards is realized in the UE.

Figure 5B:
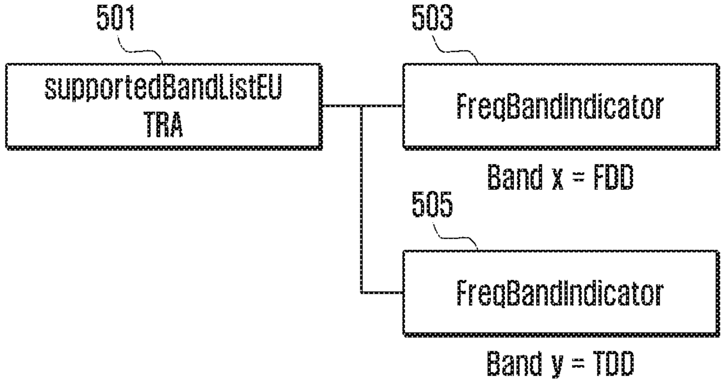

FIG. 5B includes information on an EUTRA band supported by the UE, for example, frequency band indicators 503 and 505. It is assumed that the UE supports band X and band Y, which are an FDD band and a TDD band, respectively.

Figure 5C:
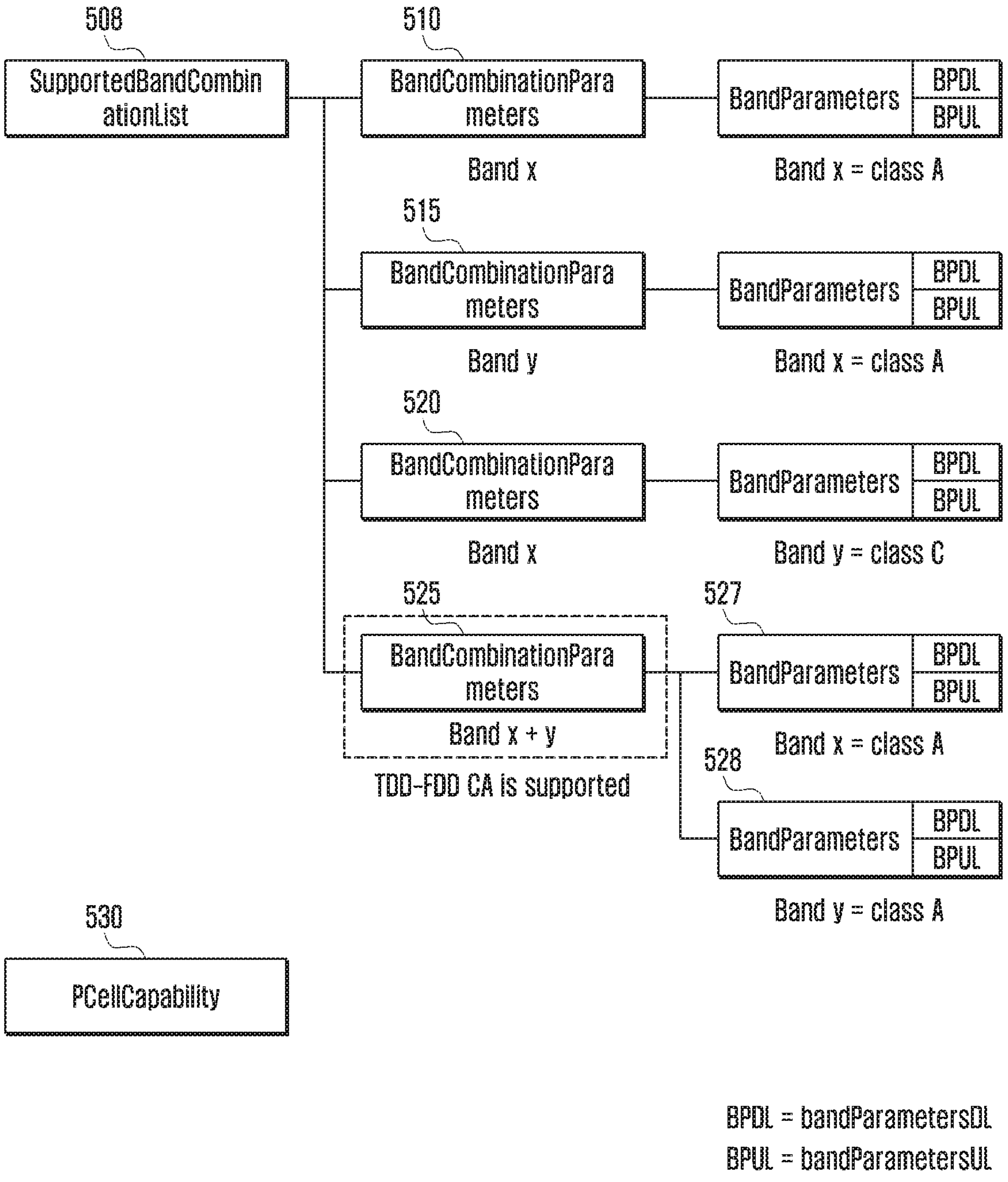

In FIG. 5C, SupportedBandCombinationList includes one or more band combination parameters (BandCombinationParameters, BCPs hereeafter) 510, 515, 520, and 525. The BCP is information on band combinations supported by the UE. The BCP includes one or more band parameters (BandParameters, BPs hereafter). The BP includes a band indicator (FreqBandIndicator), a forward band parameter (bandParametersDL, BPDL hereinafter), and a reverse band parameter (bandParametersUL, BPUL hereinafter). The BPDL includes a bandwidth class (bandwidthClass) that indicates the number of serving cells supported by the corresponding band and antenna capability information. For example, bandwidth class A may represent a capability by which one serving cell of a maximum entire bandwidth of 20 MHz may be set, bandwidth class B may represent a capability by which two serving cells may be set and a total entire bandwidth is a maximum of 20 MHz, and bandwidth class C may represent a capability by which two serving cells may be set and a total entire bandwidth is a maximum of 40 MHz.

In 525 of FIG. 5C, the UE supports CA in a combination of band X and band Y. Then, band X is an FDD band and band Y is a TDD band, the UE is a UE that supports TDD-FDD CA.

As described above, the UE that supports TDD-FDD CA in at least one band combination includes two or more entries 527 and 528 and PCellCapability 530 information into the capability report message. The PCellCapability information is information regarding in which mode PCell is supported and may include one or two information elements, which will be described in the following.

In the following an example is described in which PCell-Capability includes one information element.

All UEs that support TDD-FDD CA in the at least one band combination support [FDD PCell, TDD SCell], and PCellCapability represents only whether [TDD PCell, FDD SCell] are supported.

If the information indicates Yes, it means that the UE supports [TDD PCell, FDD SCell] and [FDD PCell, TDD SCell] in all band combinations that have been reported to support TDD-FDD CA.

If the information is not included or the information indicates No, it means that the terminal does not support [FDD PCell, TDD SCell] in any of the band combinations that have been reported to support TDD-FDD CA.

[TDD PCell, FDD SCell] is set such that PCell is a TDD serving cell and at least one SCell is an FDD serving cell.

[FDD PCell, TDD S Cell] is set such that PCell is a FDD serving cell and at least one SCell is a TDD serving cell.

Now an example is described in which PCellCapability includes two information elements.

The first information element represents whether the UE supports [TDD PCell, FDD SCell], and the second information element represents whether the UE supports [FDD PCell, TDD SCell].

If the first information indicates Yes, it means that the UE supports [TDD PCell, FDD SCell] in all band combinations that have been reported to support TDD-FDD CA.

If the first information is not included or the first information indicates No, it means that the terminal does not support [TDD PCell, FDD SCell] in any of the band combinations that have been reported to support TDD-FDD CA.

If the second information indicates Yes, it means that the UE supports [FDD PCell, TDD SCell] in all band combinations that have been reported to support TDD-FDD CA.

If the second information is not included or the second information indicates No, it means that the terminal does not support [FDD PCell, TDD SCell] in any of the band combinations that have been reported to support TDD-FDD CA.

When PCellCapability includes one information element, the capability report information reported by the UE may be analyzed as in Table 2. Accordingly, the UE may configure UE capability report information according to the contents of Table 2.

TABLE 2

| | SupportedBandCombinationList | PCellCapability | UE capability |
|---|---|---|---|
| Case 1 | All the band combinations corresponding to CA relate to FDD-FDD CA (all band indicators of the band combinations are FDD band indicators) or relate to TDD-TDD CA (all band indicators of the band combinations are TDD band indicators). | Not present | UE that does not support TDD-FDD CA |
| Case 2 | At least one of the band combinations corresponding to CA relates to TDD-FDD CA (at least one of the band indicators of the band combinations is an FDD band indicator and at least one of them is a TDD band indicator). | Not present or No | Supports TDD-FDD CA, and all band combinations supporting TDD-FDD CA support [FDD PCell, TDD SCell]. |
| Case 3 | Identical with Case 2 | Present or Yes | Supports TDD-FDD CA, and all band combinations supporting TDD-FDD CA support [FDD PCell, TDD SCell] and [TDD PCell, FDD SCell]. |

-

When PCellCapability includes two information elements, the capability report information reported by the UE is analyzed as in Table 3. Accordingly, the UE may configure UE capability report information according to the contents of Table 3.

TABLE 3

| | SupportedBand-CombinationList | PCellCapability on [FDD PCell, TDD SCell] | PCellCapability on [TDD PCell, FDD SCell] | UE capability |
|---|---|---|---|---|
| Case 4 | Identical with Case 1 | Not present | Not present | UE that does not support TDD-FDD CA |
| Case 5 | Identical with Case 2 | Not present or No | Present or Yes | Supports TDD-FDD CA, and all band combinations supporting TDD-FDD CA support [TDD PCell, FDD SCell]. |

TABLE 3-continued

| | SupportedBand-CombinationList | PCellCapability on [FDD PCell, TDD SCell] | PCellCapability on [TDD PCell, FDD SCell] | UE capability |
|---|---|---|---|---|
| Case 6 | Identical with Case 2 | Present or Yes | Not present or No | Supports TDD-FDD CA, and all band combinations supporting TDD-FDD CA support [FDD PCell, TDD SCell]. |
| Case 7 | Identical with Case 2 | Present or Yes | Present or Yes | Supports TDD-FDD CA, and all band combinations supporting TDD-FDD CA support [FDD PCell, TDD SCell] and [TDD PCell, FDD SCell]. |
| Case 8 | Identical with Case 2 | Not present or No | Not present or No | UE capability in Case 8 is described below this table. |

The following is a description of UE capability in Case 8.

This is the case in which the UE supports TDD-FDD CA in at least one band combination and PCellCapability is not included in capability information.

Because PCellCapability is a parameter introduced from a specific release (for example, Release 12), the UE (for example, the Release 10 terminal) which functions according to a lower release cannot use the parameter. However, considerable demand for TDD-FDD CA exists for the UE before the specific release. Accordingly, according to an embodiment of the present invention, when the UE functioning in a lower than the specific release reports that at least one band combination supports TDD-FDD CA and does not report PCellCapability, the UE supports [FDD PCell, TDD SCell]. Accordingly, in one of the UEs before the specific release that supports TDD-FDD CA in at least one band combination, a band combination that supports the TDD-FDD CA is included in SupportedBandCombinationList if the band combination supports [FDD PCell, TDD SCell], and the TDD-FDD CA is not included in SupportedBandCombinationList otherwise.

The UEs corresponding to the specific release and the releases after the specific release include PCellCapability if the at least one band combination supports TDD-FDD CA.

Accordingly, if the UE that has reported that the at least one band combination supports TDD-FDD CA does not report PCellCapability, the eNB identifies the release information of the UE, if the release corresponds to a release prior to the specific release, it is determined that the UE supports TDD-FDD CA, and the release corresponds to the specific release or a release after the specific release, it is determined that the UE does not support TDD-FDD CA.

An Inter-Operability Test (IOT) is an associated test between a UE and a network, and it is preferable that only a function is to be used that has passed through the associated test. Because the IOT requires both a commercially realized UE and a network, the IOT may not be performed even if the UE implements the function in the step in which an arbitrary function is not widely implemented. In particular, when a network is not present that actually uses a band combination for applying TDD-FDD CA or only a network exists which supports either FDD PCell or TDD PCell, it is impossible to perfectly perform the IOT), and the IOT may be performed only for one of FDD and TDD in the band combination even if the UE supports both the FDD PCell and TDD PCell. Accordingly, if the UE does not separately report an IOT situation for PCellCapability, a multiple connection operation may be limitedly applied because the eNB cannot be sure for which PCell mode the IOT is performed. Accordingly, the UE may include information regarding for which PCellCapability the IOT is completed for TDD-FDD CA band combinations. In particular, the information may be realized to report only the UE that supports both FDD PCell and TDD PCell. The UE that supports only one of two functions (for example, FDD PCell) omits BandCombinationParameters corresponding to the band combination from the capability information to indirectly display that the IOT is not performed if the IOT for the function is not performed in BandCombinationParameters (that includes two or more band entries, in which at least one band entry is indicated by a band indicator pertaining to a first area and at least one band entry is indicated by a band indicator pertaining to a second area) for an arbitrary TDD-FDD CA band combination.

Whether the IOT is performed may be individually reported for FDD PCell and TDD PCell or may be integrated into one information element to be reported, and the UE supports TDD-FDD CA in a predetermined band combination due to an RF capability of the UE and includes BandCombinationParameters for the band combination in the capability information only when the IOT for at least one of FDD PCell and TDD PCell is completed in the band combination.

Table 4 illustrates an example of capability information individually reporting whether the IOT is performed for FDD PCell and TDD PCell. In Table 4, the UE reports BandCombinationParameters for six band combinations, and reports IOT related information only for two BandCombinationParameters related to TDD-FDD CA.

TABLE 4

| | BandCombination-Parameters | FDD PCell IOT related information | TDD PCell IOT related information | Others |
|---|---|---|---|---|
| Band combination 1 | Band 1 | Not present | Not present | Not TDD-FDD CA |
| Band combination 2 | Band 2 | Not present | Not present | Not TDD-FDD CA |
| Band combination 3 | Band 50 | Not present | Not present | Not TDD-FDD CA |

TABLE 4-continued

| | BandCombination-Parameters | FDD PCell IOT related information | TDD PCell IOT related information | Others |
|---|---|---|---|---|
| Band combination 4 | Band 1 + Band 2 | Not present | Not present | Not TDD-FDD CA |
| Band combination 5 | Band 2 + Band 50 | Yes | No | Perform IOT for FDD PCell Not perform IOT for TDD PCell |
| Band combination 6 | Band 1 + Band 50 | Yes | Yes | Perform IOT for FDD PCell Perform IOT for TDD PCell |

In Table 4, for example, the fact that the IOT is performed for FDD PCell in band combination 5 means that TDD-FDD CA is possible for FDD PCell in the corresponding band combination.

Table 4 individually displays whether the IOTs for FDD PCell and TDD PCell are performed. Alternatively, whether the IOT for FDD PCell is performed is associated with presence of the corresponding band combination, and only whether the IOT for TDD PCell is performed may be individually displayed. For example, the fact that the IOT information for the TDD-FDD CA band combination is Yes means that both the IOTs for FDD PCell and TDD PCell are performed for the corresponding band combination, and if the IOT information for another TDD-FDD CA band combination is No, it means that only the IOT for FDD PCell is performed for the corresponding band combination.

The display of the IOT being Yes or No may be indicated by 1 bit information. Alternatively, it may be indicated by presence or absence of the corresponding information. For example, if the corresponding information is present, it may indicate Yes, and if the corresponding information is not present, it may indicate No.

Figure 6:
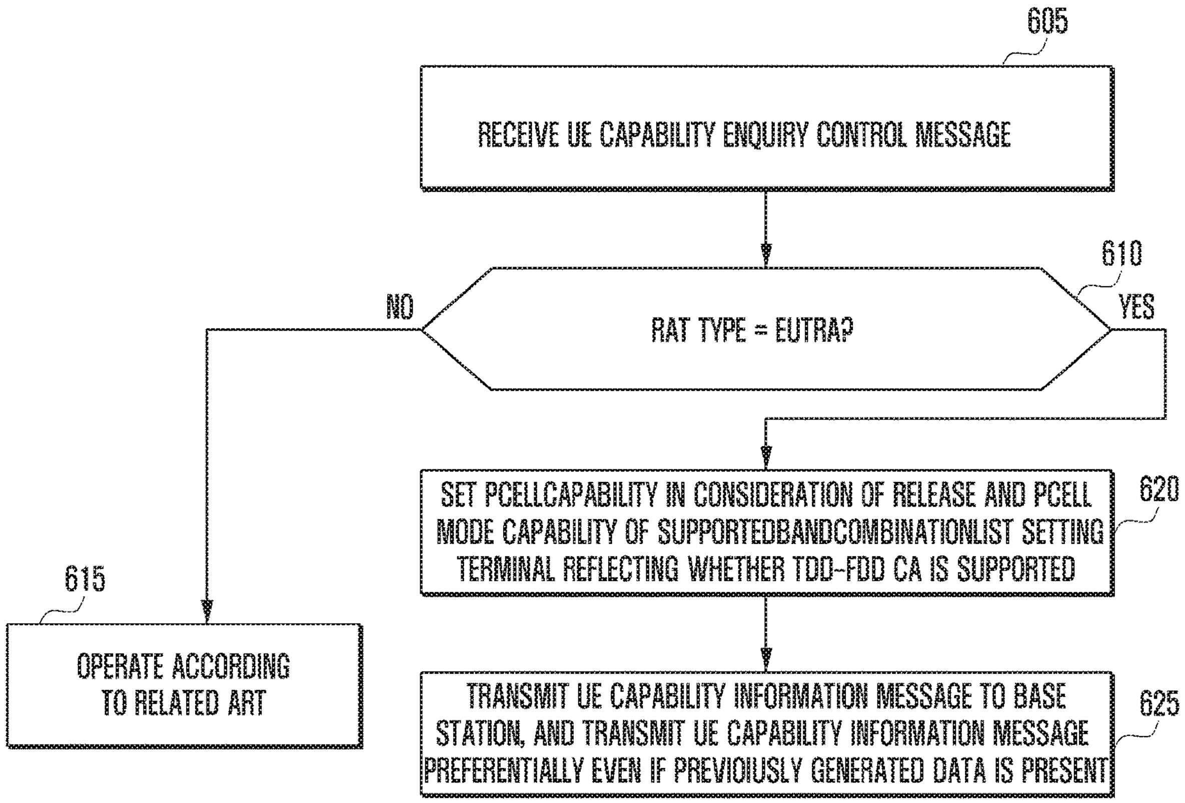
FIG. 6 is a flowchart illustrating an operation of a UE according to the first embodiment of the present invention.

FIG. 6 is a flowchart illustrating an operation of a UE according to the first embodiment of the present invention.

Referring to FIG. 6, in step 605, when receiving the UE CAPABILITY ENQUIRY control message, the UE performs step 610 and identifies the RAT Type included in the message.

If the RAT Type is set to EUTRA, the UE performs step 620, while if the RAT Type is not set to the EUTRA but another value, the UE performs step 615. In step 615, the UE performs an operation of reporting a capability for the corresponding RAT according to the related art that is described in Standard 3GPP TS 36.331. In step 620, as described above, the UE may generate performance information of the UE. The performance information may include SupportedBandList coded into ASN.1, SupportedBandCombinationList, or PCellCapability information, and the UE may set the capability information in consideration of whether TDD-FDD CA is supported or the release or PCell mode capability of the UE.

In step 625, the UE generates a UE CAPABILITY INFORMATION message containing the capability information and transmits the generated UE CAPABILITY INFORMATION message to the eNB. Then, if the user data (for example, an IP packet or a voice frame) that were generated first are present, the UE CAPABILITY INFORMATION message may be transmitted ahead of the user data that were generated first.

Second Embodiment

The UE reports all bands and band combinations supported by the UE to SupportedBandCombinationList. The amount of reported information is not large when the number of bands supported by the UE is small, but as the numbers of bands and band combinations supported by the UE increase, the size of SupportedBandCombinationList may also exponentially increase.

According to the present invention, the problem is solved by reporting only information on a capability required by the eNB.

Figure 7:
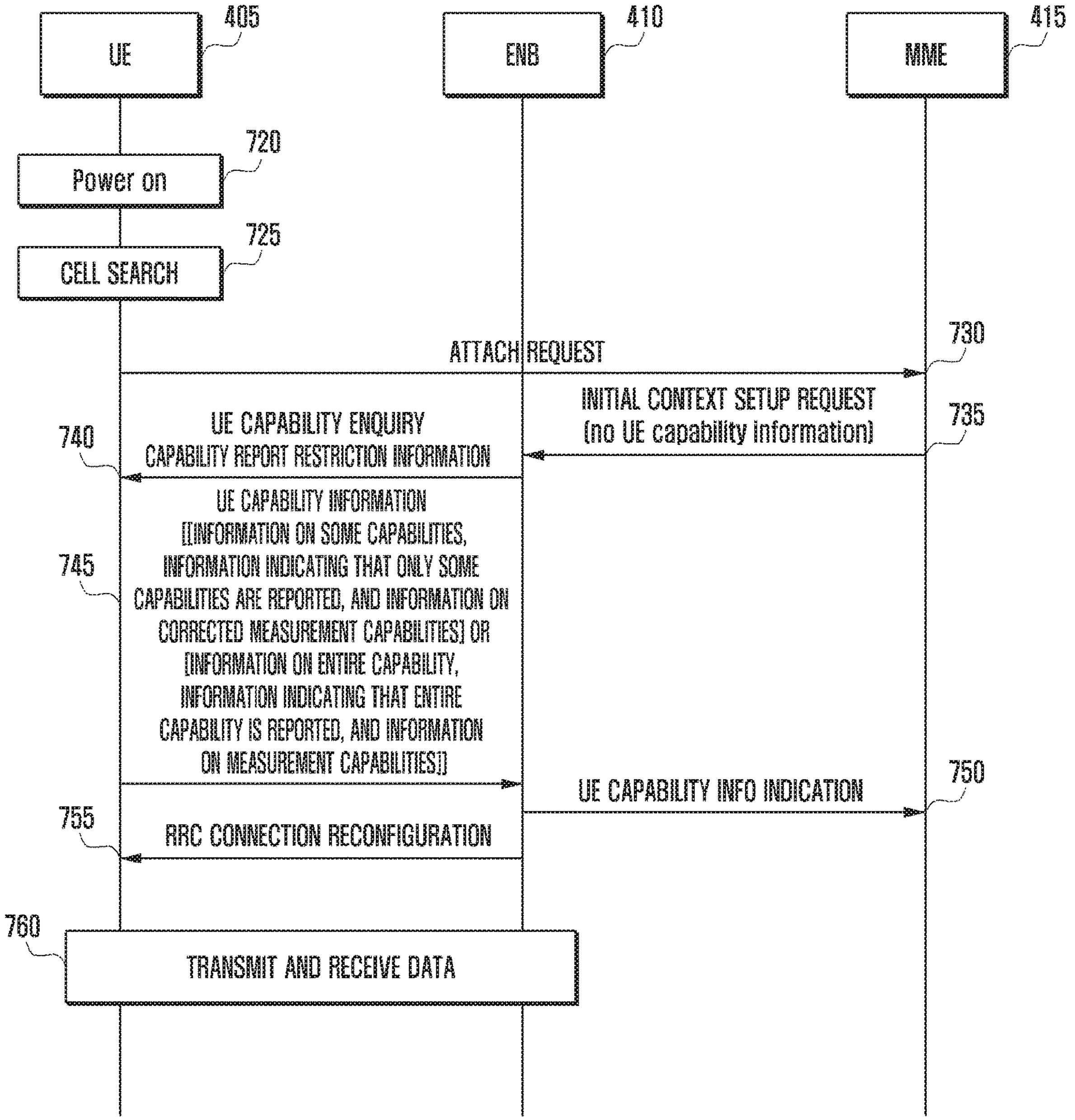
FIG. 7 is a diagram illustrating an operation of an LTE system according to a second embodiment of the present invention.
Figure 8:
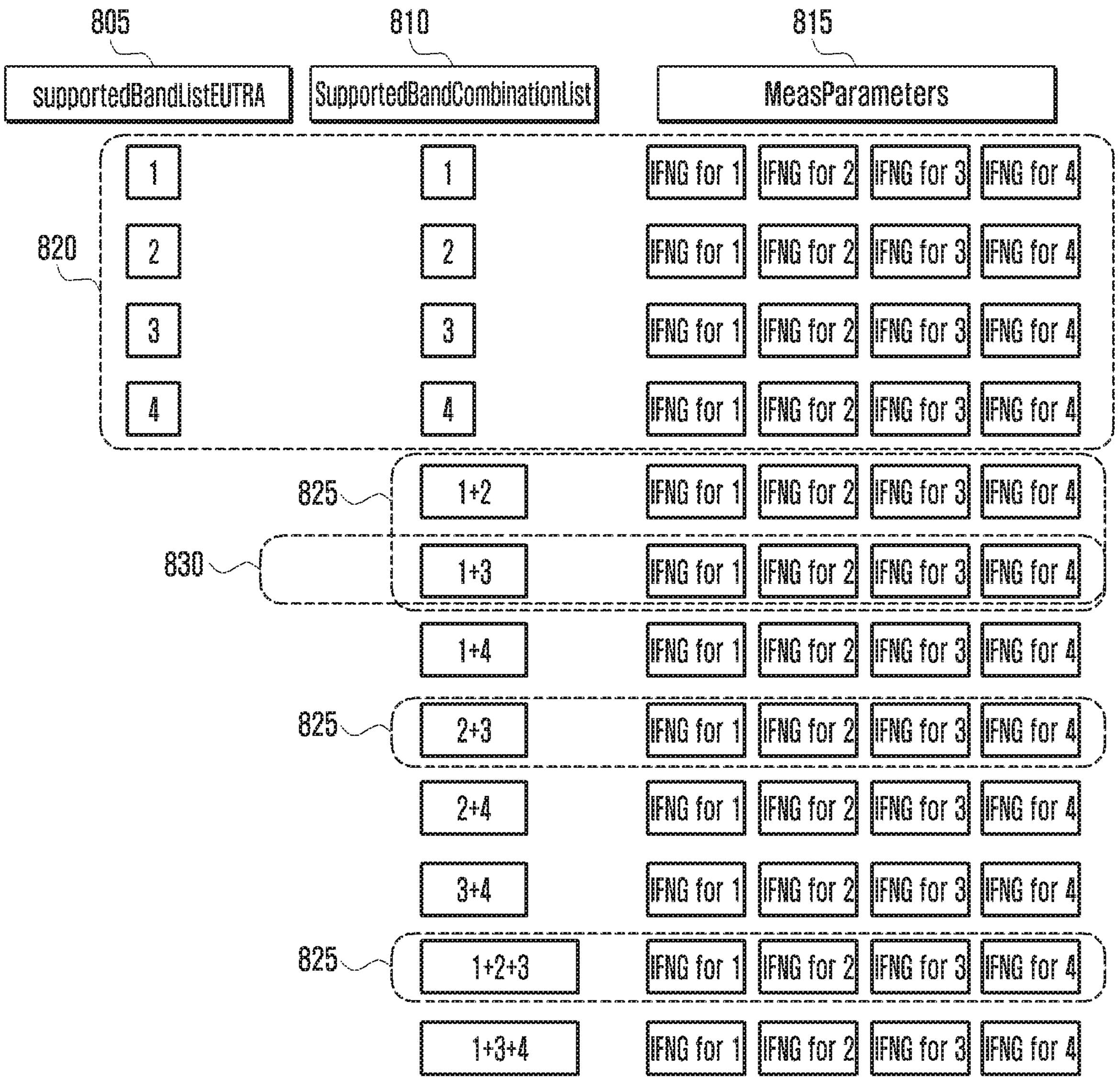
FIG. 8 is a diagram illustrating an example of capability report restriction information of a UE according to the second embodiment of the present invention.

FIG. 7 is a diagram illustrating an operation of an LTE system according to a second embodiment of the present invention.

Like in steps 420 to 435 of FIG. 4, after steps 720 to 735 are performed, the eNB transmits a control message called UE CAPABILITY ENQUIRY to the UE in step 740. The control message may further include capability report restriction information that indicates that only a predetermined capability will be reported in order to restrict the size of UE CAPABILITY INFORMATION.

Provided is a first example of capability report restriction information (hereinafter, Capability report restriction information 1).

In the eNB, or a mobile communication network that currently provides a service to the UE, capability report restriction information 1 is information that indicates that capability information related to an actually used frequency band and includes an E-UTRA frequency list.

Further it is provided a second example of capability report restriction information (hereinafter, Capability report restriction information 2).

In the eNB, or a mobile communication network that currently provides a service to the UE, capability report restriction information 2 is information that indicates that capability information related to an actually used frequency band combination and includes an E-UTRA frequency band combination list.

Yet further it is provided a third example of capability report restriction information (hereinafter, Capability report restriction information 3).

In the eNB, or a mobile communication network that currently provides a service to the UE, capability report restriction information 3 is information that indicates that capability information related to an actually used frequency band combination and a bandwidth class and includes an E-UTRA frequency band combination list and a highest bandwidth class supported by the current network.

Even yet further it is provided a fourth example 4 of capability report restriction information (hereinafter, Capability report restriction information 4).

In an eNB or a mobile communication network currently serviced by an UE, an E-UTRA frequency band combination list and a type of the frequency band combination (or the number of configurations) are configured as information that indicates that only capability information related to a frequency band combination of a specific type (or configured with a specific number of frequency band combinations) of a frequency band combination of the frequency band combinations that may be actually used.

In the present invention, a capability including frequency bands at which the UE may communicate or frequency band combinations at which the frequency band combinations may communicate is defined as an entire capability of the UE. In step 745, a UE CAPABILITY INFORMATION message that reports only some capabilities of the entire capability of the UE according to the capability report restriction information may be transmitted to the eNB. Then, the UE may include information such that only some capabilities are reported in UE CAPABILITY INFORMATION. Alternatively, the UE may report the entire capability of the UE regardless of the capability report restriction information. Then, the UE may include information such that the entire capability is reported in UE CAPABILITY INFORMATION. Alternatively, the eNB may be informed of a fact that the UE reports an entire capability by excluding information regarding the fact that some capabilities are reported from UE CAPABILITY INFORMATION.

When the UE reports some capabilities of the entire capability according to the capability report restriction information, the UE selects some capabilities that will be reported as follows.

<When Capability Report Restriction Information 1 is Used>

SupportedBandListEUTRA: includes all E-UTRA bands supported by the UE.

SupportedBandCombinationList: a band combination including one band (or a band entry) of band combinations supported by the UE includes all E-UTRA bands supported by the UE, and a band combination including two or more bands (or band entries) includes only a band combination associated with the bands indicated by capability report restriction information 1.

MeasParamters: includes only the remaining measurement capability information other than measurement capability information related to a band combination excluded by capability report restriction information 1 of the entire measurement capability information of the UE.

Capability report restriction information 1 is not applied for a band combination including one band in SupportedBandCombinationList because the band combination is applied not to a CA operation but to a general operation (non-CA band) so that it may be necessary when a handover to another communication network is performed later, and the number of band combinations including one band is restrictive so that the number of the sizes of the messages is mere even if the all the band combinations are included.

<When Capability Report Restriction Information 2 is Used>

SupportedBandListEUTRA: includes all E-UTRA bands supported by the UE.

SupportedBandCombinationList: a band combination including one band (or a band entry) of band combinations supported by the UE includes all E-UTRA bands supported by the UE, and a band combination including two or more bands (or band entries) includes only a band combination indicted by capability report restriction information 2.

MeasParamters: includes only the remaining measurement capability information other than measurement capability information related to a band combination excluded by capability report restriction information 2 of the entire measurement capability information of the UE.

<When Capability Report Restriction Information 3 is Used>

SupportedBandListEUTRA: includes all E-UTRA bands supported by the UE.

SupportedBandCombinationList: a band combination including one band (or a band entry) of band combinations supported by the UE includes all E-UTRA bands supported by the UE, and a band combination including two or more bands (or band entries) includes only the remaining band combinations other than band combinations indicted by capability report restriction information 3.

MeasParamters: reports only the remaining measurement capability information other than measurement capability information related to a band combination excluded by capability report restriction information 3 of the entire measurement capability information of the UE.

<When Capability Report Restriction Information 4 is Used>

SupportedBandListEUTRA: includes all E-UTRA bands supported by the UE.

SupportedBandCombinationList: The band combinations of the band combinations supported by the UE, which is indicated by capability report restriction information 4, also include only band combinations corresponding to the indicated specific type (or corresponding to the indicated specific number). Then, band combinations including one band (or band entry) or carrier aggregated band combinations including two downlinks band and one uplink band may be included regardless of the indicated information. That is, parts of the band combinations may be included in the indicated information and the rest of the band combinations may be not included in the indicated information.

Figure 5D:
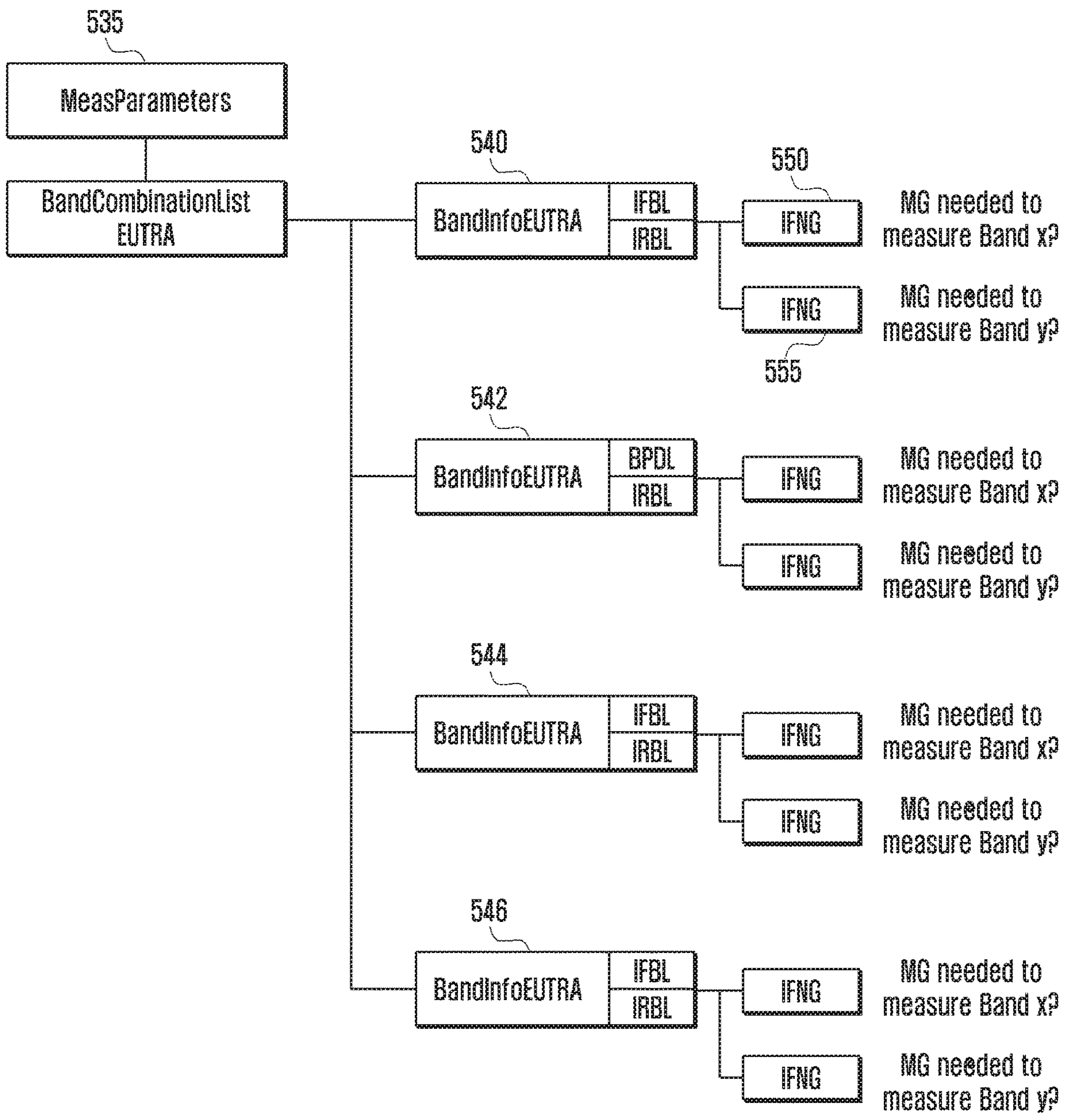

In FIG. 5D, the MeasParameters (535) is information related to the measurement capability of the UE. The measurement capability parameters include band information elements (BandInfoEUTRAs) (hereinafter, BIs) 540, 542, 544, and 546 corresponding the number of the BCPs 510, 515, 520, and 525, and the BIs correspond to the BCPs according to the sequence in which the BCPs and the corresponding information elements are recorded. That is, the BI 540 corresponds to the BCP 510, and the BI 542 corresponds to the BCP 515. The BI includes interFreqBandList (hereinafter, IFBL) that is information regarding whether a measurement gap is necessary when an inter-frequency measurement is performed for frequency bands and interRAT-BandList (hereinafter, IRBL) that is information regarding whether a measurement gap is necessary when frequency bands of other Radio Access Technologies (RATs) (for example, UTRAs) are measured. The IFBL includes Measurement Gap Need for Gaps (hereinafter, IFNGs) corresponding to the number of EUTRA frequency bands supported by the UE. The IFNG displays whether a measurement gap is necessary in the sequence for EUTRA frequency bands recorded in the supported EUTRA frequency band list (supportedBandListEUTRA). If the UE records band X and band Y in supportedBandListEUTRA, the first IFNG 550 represents a measurement gap needed for band X and the second IFNG 555 represents a measurement gap needed for band Y. That is, the IFNG 550 represents whether a measurement gap is necessary when the UE performs an inter-frequency measurement for band X in the case where the UE is set according to the BCP 510, and the IFNG 555 represents whether a measurement gap is necessary when an inter-frequency measurement is performed for band Y.

The frequency band reported in supportedBandListEUTRA should be reported as band combination information having one band entry even in SupportedBandCombinatonList to properly set a measurement capability parameter. When the UE generates the capability report message, the BCP of the BCPs for the band recorded in the n-th order in supportedBandListEUTRA, which includes one entry, sets the sequence of the BCPs to be recorded in the n-th order even in SupportedBandCombinationList. For example, because band X and band Y are sequentially recorded in supportedBandListEUTRA 501, the SupportedBandCombinationList 508 codes band X and band Y such that the BCP 510 including only band X and the BCP 515 including only band Y are the first and second BCPs. If at least one BCP includes only band X, the BCP to which CA is not applied (that is, a bandwidth class is A) is disposed first, and the BCP to which CA is applied is disposed after all the single band BCPs to which CA is not applied are disposed. That is, among the BCPs 510 and 520 including only band X, the BCP 510 is disposed in the first place and the BCP 520 is disposed in the next place of the BCP including only band Y.

In summary, when the UE performs a limited capability report, the entire SupportedBandListEUTRA of the UE may be reported without being limited by the capability report restriction information.

If the eNB receives a UE CAPABILITY INFORMATION message from the UE in step 745, steps 750 to 760 are performed like steps 450 to 460.

When capability report restriction information 4 is used, the control message of step 740 includes information on a band list that will restrict report of capability (for example, only band 1, band 2, band 3, and band 4 are included in the capability report target list), and information on a carrier aggregation band combination including a specific number of band combinations using the band list (for example information of a combination of band 3 and band 1 may be included regarding a carrier aggregation band combination including X downlinks (three downlinks) and Y uplinks (for example, one uplink)).

If the UE receives a message of step 740 including the information, for example, that only a band combination including one band (or band entry) to which carrier aggregation supported by the UE is not applied for band 1, band 2, band 3, and band 4 and carrier aggregation band combination information elements of all carrier aggregation band combinations including N downlinks and M uplinks (N and M are integers equal to or larger than 1), which includes three downlinks and one uplink may be included in the message of step 745 to be transmitted, and accordingly, the amount of transmitted information can be reduced.

In some embodiments of the present invention, a band combination including one band (or band entry) and carrier aggregation band combinations including two downlinks and one uplink may be always included regardless of carrier aggregation band combination information ("3" and "1" in the example) corresponding to the restricted specific number. That is, the carrier aggregation band combinations may be regarded as default band combinations included in the message of step 745. The default band combinations correspond to one method of the embodiment, and a method of excluding a default band combination is also possible. In this case, only information on carrier aggregation band combinations of all the band combinations supported by the UE, among band 1, band 2, band 3, and band 4, which include downlinks and uplinks corresponding to the numbers indicated by the eNB is reported. For example, only the carrier aggregation band combination information including three downlinks and one uplink may be reported.

The band combination including one band (or band entry) may be expressed by one downlink and one uplink (X=1, Y=1). In another method, if the X and Y values are restricted by the eNB with X downlinks and Y uplinks, the UE may include information on band combinations including a carrier aggregation band combination corresponding to a subset of a carrier aggregation band combination and one band (or band entry) as well as carrier aggregation band combinations including X downlinks and Y uplinks in the message of step 745. For example, in step 740, the eNB indicates only band 1, band 2, band 3, and band 4 as a capability report target list and it is indicated that X is 3 and Y is 1, and it is assumed that the UE supports a band combination including one band (or band entry) and all carrier aggregation band combinations including all N downlinks and M uplinks (N and M are integers equal to or larger than 1) for band 1, band 2, band 3, and band 5 (band 5 is not present in the capability report target list indicated by the eNB). In addition to the carrier aggregation band combinations including three downlinks and one uplink supporting band 1, band 2, and band 3, the UE includes carrier aggregation band combinations [2+1] including two downlinks and one uplink regarded as a subset of [3+1] carrier aggregation band combinations for band 1, band 2, and band 3 and band (or band entry) combinations including one downlink and one uplink.

Regardless of which of 1, 2, 3, and 4 is used as capability report restriction information, the amount of information of the band combinations supported by the UE may exceed a maximum value that may be informed of by the message of step 745. In order to handle such a case, the capability report restriction information may be indicated in consideration of a priority when the capability report restriction information is indicated by the eNB through the message of step 740. The priority information may be indicated as explicit control information or indicated implicitly. As an example of the explicit control information, the capability report restriction information may be classified into groups for the priorities and may be signaled. Meanwhile, as an example of implicit control information, the priorities may be implicitly signaled in the arrangement sequence by arranging the capability report restriction information in the sequence from the highest priority to the lowest priority (or may be arranged in the sequence from the lowest priority to the highest priority). If the number of band combinations that will be included in the message of step 745 exceeds a maximum value that can be accommodated in accordance with the capability report restriction information indicated by the message of step 740, it is preferred that only those band combination information elements are included for the bands having a relatively higher priority until the mentioned maximum value is reached.

Meanwhile, information that indicates a state in which band combinations are included in the message of step 745 according to the capability report restriction information indicated by the eNB but exceeds a maximum value so as not to include all the band combinations may be included in the message of step 745. When the indication information is included in the message received in step 745 and if there is a need for band combinations present other than the band combinations included in the message received in step 745, the eNB may additionally request information on additional support band combinations from the UE using capability report restriction information elements 1, 2, 3, and 4. FIG.

8 is a diagram illustrating an example of capability report restriction information according to a second embodiment of the present invention.

When the UE determines SupportedBandCombinationList when reporting a restricted capability, for the BCPs including only one band information element, the UE records all BCPs without being restricted by capability report restriction information and for the BCPs including at least (preferably more than) one band information element, the UE records BCPs determined according to the capability report restriction information.

When the UE performs a restricted capability report, a newly generated MeasParameters is used based on SupportedBandCombinationList and restricted by the capability report restriction information rather than MeasParameters generated based on the entire SupportedBandCombinationList of the UE.

For example, the UE supports, 805, band 1, band 2, band 3, and band 4, and supports, 810, a total of 12 band combinations. An IFNG that indicates, 815, whether measurement gaps are necessary for bands of the 12 band combinations is recorded in MeasParameters of the UE.

Band 1, band 2, band 3, and band 5 are indicated to the UE as the first capability report restriction information. The UE records information on all bands supported by the UE in supportedBandListEUTRA, the BCPs including one band are recorded in SupportedBandCombinationList according to the sequence recorded in supportedBandListEUTRA, and the measurement capability information elements 820 for the BCPs are all recorded.

The UE sequentially records with respect to BCPs including at least one band the BCPs that satisfy the following condition in SupportedBandCombinationList.

<Condition>

The BCP corresponding to the band combination including at least one band, for example, the UE that includes only bands of all E-UTRA bands, which are indicated by the first capability report restriction information sequentially includes the BCPs corresponding to band combinations [1+2], [1+3], [1+2+3] in SupportedBandCombinationList, and includes, 825, the BIs corresponding to the BCPs in MeasParameters.

That is, the UE generates a UE capability report message including 820 and 825 and transmits the UE capability report message to the eNB.

Because the UE may not report a capability for all bands (in the example, band 1, band 2, band 3, and band 5) indicated by the eNB (in the example, the BCP for band 5 is not reported but the BCPs including band 1, band 2, and band 3 are reported), and the UE may include information regarding which bands the band combination information are recorded for or indicating in the capability report message. That is, if the eNB indicates band 1, band 2, band 3, and band 5 as capability report restriction information 1, the UE may include, in the capability report message, information indicating that the bands considered by the UE in the band combination information are band 1, band 2, and band 3. That is, the frequency band list including some of capability report restriction information 1 may be included in the capability report message as information that is separate from supportedBandListEUTRA.

The same principle is also applied when capability report restriction information elements 2 and 3 are used. For example, if band combinations [1+3] and [1+5] are indicated as capability report restriction information element 2, the UE generates a capability report message including 820 and 830 and reports the generated message.

In order to prevent the eNB from requesting a capability report whenever the UE sets connection with the eNB, the UE may include information that may distinguish a case of reporting an entire capability from a case of reporting some capabilities in the capability report message.

If capability information of the UE and information regarding whether the capability information is information on the entire capability or information on some capabilities may be recorded in the UE CAPABILITY INFO INDICATION message and transmitted to the MME, the MME may store the transferred information. When the UE newly sets a connection later, the MME may include information regarding whether the information is information on the entire capability or information on some capabilities and capability information of the UE in the INITIAL CONTEXT SETUP REQUEST message and may transmit the message to the eNB. If the transferred capability information is information on the entire capability, the eNB does not transmit UE CAPABILITY ENQUIRY to the UE. If the transferred capability information is information on some capabilities and band combination information desired by the eNB is omitted, the eNB generates UE CAPABILITY ENQUIRY and transmits UE CAPABILITY ENQUIRY to the UE.

Figure 9:
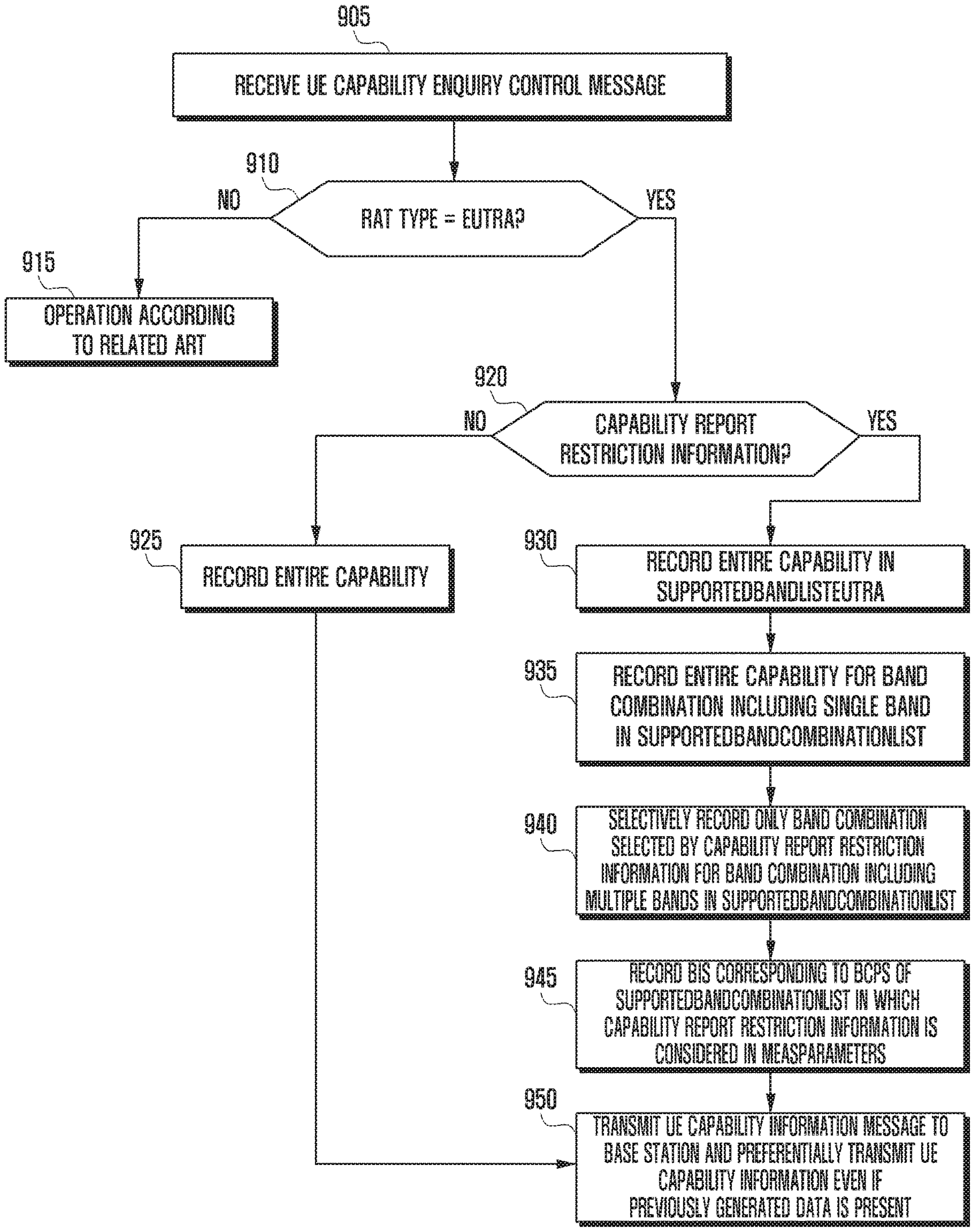
FIG. 9 is a flowchart illustrating an operation of a UE according to the second embodiment of the present invention.

FIG. 9 is a flowchart illustrating an operation of a UE according to the second embodiment of the present invention.

Referring to FIG. 9, in step 905, when receiving the UE CAPABILITY ENQUIRY message, the UE performs step 910 and identifies the RAT Type included in the message.

If the RAT Type is set to EUTRA, the UE performs step 920, while if the RAT Type is not set to the EUTRA but another value, the UE performs step 915. In step 915, the UE is operated according to the related art like in step 615. In step 920, the UE inspects whether capability report restriction information is recorded in the UE CAPABILITY ENQUIRY message, and if capability report restriction information is recorded, step 930 is performed, and if capability report restriction information is not recorded, step 925 is performed.

In step 925, the UE records the entire capability in the UE CAPABILITY INFORMATION message and performs step 950.

In step 930, the UE records an entire capability in supportedBandListEUTRA. That is, the UE records all supported bands.

In step 935, the UE records an entire capability for a band combination including a single band in SupportedBandCombinationList.

In step 940, the UE selectively records only a band combination selected by the capability report restriction information for a band combination including multiple bands in SupportedBandCombinationList.

In step 945, the UE records capabilities of the BCPs of SupportedBandCombinationList and the BIs corresponding to the BCPs in which capability report restriction information is considered in measParameters.

The information on the recorded capability may be coded by ASN.1.

In step 950, the UE generates a UE CAPABILITY INFORMATION message that recorded the information recorded in steps 930 to 945 to transmit the generated UE CAPABILITY INFORMATION message to the eNB. Then, if the user data (for example, an IP packet or a voice frame) that were generated first are present, the UE CAPABILITY INFORMATION message may be transmitted ahead of the user data that were generated first.

Figure 10:
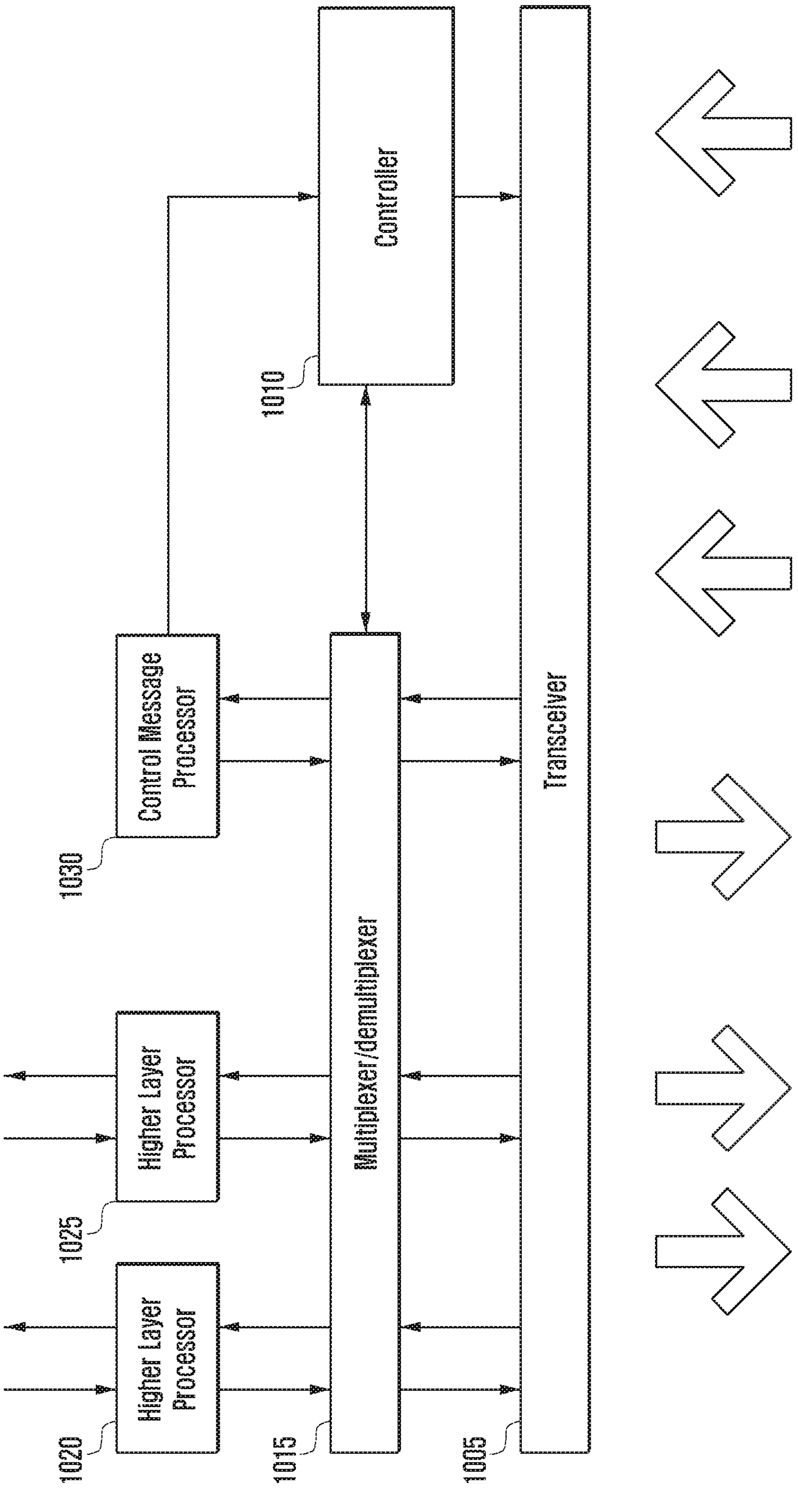
FIG. 10 is a block diagram illustrating a configuration of a UE according to an embodiment of the present invention.

FIG. 10 is a block diagram illustrating a configuration of a UE according to an embodiment of the present invention.

Referring to FIG. 10, the UE includes a transceiver 1005, a controller 1010, a multiplexer and demultiplexer 1015, a control message processor 1030, and at least one higher layer processor 1020 and 1025.

The transceiver 1005 receives data and a predetermined control signal through a downlink channel of a serving cell, and transmits data and a predetermined control signal through an uplink channel of the serving cell. In the case that a plurality of serving cells is set, the signal transceiver 1005 transmits and receives data and a control signal through the plurality of serving cells.

The multiplexing and demultiplexing unit 1015 multiplexes data generated by the higher layer processors 1020 and 1025 or the control message processor 1030, or demultiplexes data received in the signal transceiver 1005 to transmit the data to the suitable higher layer processors 1020 and 1025 or the control message processor 1030.

The control message processor 1030 processes the control message received from the eNB, and performs a necessary operation. Particularly, when receiving a control message such as the UE CAPABILITY ENQUIRY, the control message processor 1030 analyzes contents of the control message and performs a necessary operation, for example, generates and transmits a UE CAPABILITY INFORMATION control message including the capability information of the UE to the subordinate layers 1015 and 1005. The control message processor 1030 may perform an operation corresponding to the terminal operation illustrated in FIGS. 4 to 9 and a necessary control operation.

The higher layer processors 1020 and 1025 may be configured according to each service, which processes and transmits data generated by a user service such as File Transfer Protocol (FTP) or Voice over Internet Protocol (VoIP) to the multiplexing and demultiplexing unit 1015 or processes and transmits data received from the multiplexing and demultiplexing unit 1015 to a higher layer service application.

The controller 1010 identifies a scheduling instruction received through the signal transceiver 1005, for example, backward grants, and controls the signal transceiver 1005 and the multiplexing and demultiplexing unit 1015 so as to perform a backward transmission through a suitable transmission resource at an appropriate time point.

Although FIG. 10 illustrates that the transceiver 1005, the controller 1010, the multiplexer and demultiplexer 1015, the control message processor 1030, and the higher layer processor 1020 and 1025 are configured in separate blocks and the blocks perform different functions, it is only for convenience of description and the functions are not classified. For example, the controller 1010 may generate a UE CAPABILITY INFORMATION message including capability information of the UE, and transmit the generated UE CAPABILITY INFORMATION message to the eNB. The capability information of the UE may include information regarding one or more band combinations supported by the UE and whether Time Division Duplexing-Frequency Division Duplexing Carrier Aggregation (TDD-FDD CA) is supported for the band combinations. Here, the capability information of the UE may further include at least one of a measurement capability parameter (MeasParameter) of the UE, PCell mode related information (PCellCapability), and release information (accessStratumRelease) of the UE. The PCell mode related information may include at least one of information on whether the UE supports TDD PCell or information on whether the UE supports FDD PCell. The controller 1010 may receive a UE CAPABILITY ENQUIRY message that instructs a reporting of capability information of the UE from the eNB, identifying a Radio Access Technology type contained in the UE CAPABILITY ENQUIRY message, and determine terminal capability information that will be contained in the UE CAPABILITY INFORMATION message according to the identified RAT type. The controller 1010 may transmit the UE CAPABILITY INFORMATION message ahead of user data generated before the UE CAPABILITY INFORMATION message is generated. The measurement capability parameter of the UE includes BandCombinationParameters (BCPs) and band information (BandInfoEUTRAs) (BIs), and the number of the BCPs and the number of BIs are the same and the BCP may have corresponding BIs. The capability information of the UE may further include information regarding whether Inter-Operability Tests (IOTs) for the PCellCapabilitys are completed for TDD-FDD CA band combinations.

Figure 11:
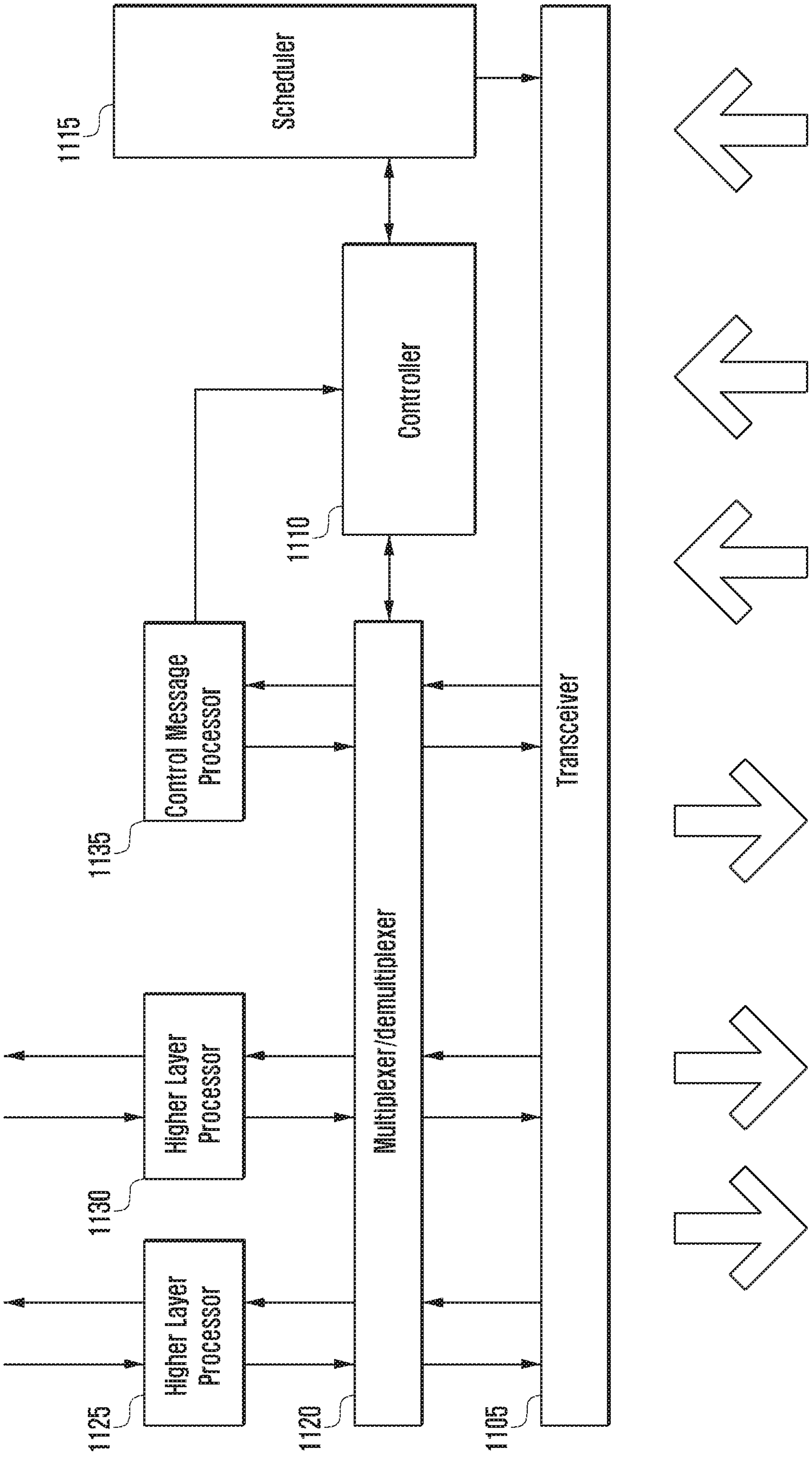
FIG. 11 is a block diagram illustrating a configuration of a base station according to an embodiment of the present invention.

FIG. 11 is a block diagram illustrating a configuration of the eNB according to an embodiment of the present invention, and includes a transceiver 1105, a controller 1110, a multiplexer and demultiplexer 1120, a control message processor 1135, various higher layer processors 1125 and 1130, and a scheduler 1115.

Referring to FIG. 11, the transceiver 1105 transmits data and a predetermined control signal to a downlink carrier and receives data and a predetermined control signal to an uplink carrier. In the case that a plurality of carriers are set, the signal transceiver 1105 transmits and receives data and a control signal through the plurality of carriers.

The multiplexing and demultiplexing unit 1120 multiplexes data generated by the higher layer processors 1125 and 1130 or the control message processor 1135, or demultiplexes data received in the signal transceiver 1105 to transmit the data to the suitable higher layer processors 1125 and 1130, the control message processor 1135, or the controller 1110. The control message processor 1135 processes a control message transmitted by the UE to transfer necessary information to the controller 1110, or generates a control message that will be transferred to the UE under the control of the controller 1110 to transfer the control message to the lower layer.

The higher layer processors 1125 and 1130 may be constituted for each bearer, which constitutes the RLC PDU of data received from the S-GW or another eNB to transmit the RLC PDU to the multiplexing and demultiplexing unit 1120, or constitutes the PDCP Service Data Unit (SDU) of the RLC PDU received from the multiplexing and demultiplexing unit 1120 to transmit the PDCP SDU to the S-GW or another eNB.

The scheduler 1115 allocates a transmission resource to the UE at a suitable time point considering a buffer state, a channel state, and the like of the UE, and enables the signal transceiver 1105 to process a signal received from the UE, or to transmit a signal to the UE.

The controller 1110 instructs the control message processor 1135 to generate and transmit a suitable RRC control message to the UE, or performs necessary operations by using control information processed by the control message processor 1135. For example, an operation corresponding to the terminal operation illustrated in FIGS. 4 to 9 and a necessary control operation may be performed.

Although FIG. 11 illustrates that the transceiver 1105, the controller 1110, the multiplexer and demultiplexer 1120, the control message processor 1135, and the higher layer processor 1125 and 1130 are configured in separate blocks and the blocks perform different functions, it is only for convenience of description and the functions are not classified. For example, the controller 1110 may transmit a UE CAPABILITY ENQUIRY message that instructs a reporting of capability information of the UE to the UE, and receive a UE CAPABILITY INFORMATION message including the capability information of the UE from the UE. The UE CAPABILITY INFORMATION message may include information regarding one or more band combinations supported by the UE and whether Time Division Duplexing-Frequency Division Duplexing Carrier Aggregation (TDD-FDD CA) is supported for the supported band combinations. If the UE CAPABILITY INFORMATION message is received, the controller 1110 transmits a UE capability information indication (UE CAPABILITY INFO INDICATION) message including the capability information to a Mobility Management Entity (MME). The capability information of the UE CAPABILITY INFORMATION message may further include at least one of a measurement capability parameter (MeasParameter) of the UE, PCell mode related information (PCellCapability), and release information (accessStratumRelease) of the UE. When the capability information of the UE CAPABILITY INFORMATION message does not include PCell mode related information, the controller 1110 may determine whether the UE supports TDD-FDD CA based on release information of the UE contained in the capability information of the UE CAPABILITY INFORMATION message. The UE CAPABILITY ENQUIRY message may include information that instructs the UE to report one of capability information related to a frequency band actually used by the UE, capability information related to a frequency band combination actually used by the UE, capability information related to a frequency band combination and a bandwidth class actually used by the UE.

In accordance with further embodiments of the present invention, a method may include transmitting capability information of a User Equipment (UE) to an evolved Node B (eNB) by the UE by means of generating a UE CAPABILITY INFORMATION message including capability information of the UE; and transmitting the UE CAPABILITY INFORMATION message to the eNB, wherein the capability information of the UE includes information regarding one or more band combinations supported by the UE and whether Time Division Duplexing-Frequency Division Duplexing Carrier Aggregation (TDD-FDD CA) is supported for the band combinations.

A corresponding UE for transmitting capability information of the UE to an eNB can include a transceiver configured to transmit and receive signals to and from the eNB; and a controller configured to generate a UE CAPABILITY INFORMATION message including capability information of the UE, and transmitting the generated UE CAPABILITY INFORMATION message to the eNB, wherein the capability information of the UE includes information regarding one or more band combinations supported by the UE and whether Time Division Duplexing-Frequency Division Duplexing Carrier Aggregation (TDD-FDD CA) is supported for the band combinations.

In accordance with further embodiments of the present invention, a method may include receiving capability information of a user equipment from a UE by an eNB by means of transmitting a UE CAPABILITY ENQUIRY message that indicates report of capability information of the UE to the UE; and receiving a UE CAPABILITY INFORMATION message including capability information of the UE from the UE, wherein the UE CAPABILITY INFORMATION message of the UE includes information regarding one or more band combinations supported by the UE and whether Time Division Duplexing-Frequency Division Duplexing Carrier Aggregation (TDD-FDD CA) is supported for the band combinations.

The method may include transmitting a UE CAPABILITY ENQUIRY message that indicates report of capability information of the UE to the UE.

A corresponding eNB for receiving capability information of a UE from the UE can include a transceiver configured to transmit and receive signals to and from the UE; and a controller configured to transmit a UE CAPABILITY ENQUIRY message that indicates report of capability information of the UE to the UE and to receive a UE CAPABILITY INFORMATION message including the capability information of the UE from the UE, wherein the UE CAPABILITY INFORMATION message includes information regarding one or more band combinations supported by the UE and whether Time Division Duplexing-Frequency Division Duplexing Carrier Aggregation (TDD-FDD CA) is supported for the band combinations.

The eNB may further include a controller that is configured for generating a UE CAPABILITY ENQUIRY message that indicates the UE to report capability information of the UE and the transceiver may be configured for transmitting to the UE the UE CAPABILITY ENQUIRY message.

Although specific exemplary embodiments have been described in the detailed description of the present disclosure, various change and modifications may be made without departing from the scope of the present disclosure. Therefore, the scope of the present invention is solely defined by the appended claims.

What is claimed is:

1. A method performed by a terminal in a wireless communication system, the method comprising:

receiving, from a base station, an user equipment (UE) capability enquiry message including first information on a radio access technology (RAT) type and second information that requests at least one frequency band combination supported by the terminal;

determining the at least one frequency band combination supported by the terminal based on the first information and the second information; and transmitting, to the base station, an UE capability information message as a response to the UE capability enquiry message, the UE capability information message including the at least one frequency band combination supported by the terminal.

2. The method of claim 1, wherein the UE capability enquiry message further includes third information on a maximum bandwidth.

3. The method of claim 2, wherein the at least one frequency band combination supported by the terminal is determined further based on the third information.

4. The method of claim 2, wherein each frequency band in the at least one frequency band combination does not exceed the maximum bandwidth.

5. The method of claim 1, wherein the at least one frequency band combination in the UE capability information message is prioritized based on the second information included in the UE capability enquiry message.

6. A method performed by a base station in a wireless communication system, the method comprising:

generating an user equipment (UE) capability enquiry message including first information on a radio access technology (RAT) type and second information that requests at least one frequency band combination supported by a terminal;

transmitting, to the terminal, the UE capability enquiry message; and receiving, from the terminal, an UE capability information message as a response to the UE capability enquiry message, the UE capability information message including the at least one frequency band combination supported by the terminal determined based on the first information and the second information.

7. The method of claim 6, wherein the UE capability enquiry message further includes third information on a maximum bandwidth.

8. The method of claim 7, wherein the at least one frequency band combination supported by the terminal is determined further based on the third information.

9. The method of claim 7, wherein each frequency band in the at least one frequency band combination does not exceed the maximum bandwidth.

10. The method of claim 6, wherein the at least one frequency band combination in the UE capability information message is prioritized based on the second information included in the UE capability enquiry message.

11. A terminal in a wireless communication system, the terminal comprising:

a transceiver; and a controller configured to:

receive, from a base station via the transceiver, an user equipment (UE) capability enquiry message including first information on a radio access technology (RAT) type and second information that requests at least one frequency band combination supported by the terminal, determine the at least one frequency band combination supported by the terminal based on the first information and the second information, and transmit, to the base station via the transceiver, an UE capability information message as a response to the UE capability enquiry message, the UE capability information message including the at least one frequency band combination supported by the terminal.

12. The terminal of claim 11, wherein the UE capability enquiry message further includes third information on a maximum bandwidth.

13. The terminal of claim 12, wherein the at least one frequency band combination supported by the terminal is determined further based on the third information.

14. The terminal of claim 12, wherein each frequency band in the at least one frequency band combination does not exceed the maximum bandwidth.

15. The terminal of claim 11, wherein the at least one frequency band combination in the UE capability information message is prioritized based on the second information included in the UE capability enquiry message.

16. A base station in a wireless communication system, the base station comprising:

a transceiver; and a controller configured to:

generate an user equipment (UE) capability enquiry message including first information on a radio access technology (RAT) type and second information that requests at least one frequency band combination supported by a terminal, transmit, to the terminal via the transceiver, the UE capability enquiry message, and receive, from the terminal via the transceiver, an UE capability information message as a response to the UE capability enquiry message, the UE capability information message including the at least one frequency band combination supported by the terminal determined based on the first information and the second information.

17. The base station of claim 16, wherein the UE capability enquiry message further includes third information on a maximum bandwidth.

18. The base station of claim 17, wherein the at least one frequency band combination supported by the terminal is determined further based on the third information.

19. The base station of claim 17, wherein each frequency band in the at least one frequency band combination does not exceed the maximum bandwidth.

20. The base station of claim 16, wherein the at least one frequency band combination in the UE capability information message is prioritized based on the second information included in the UE capability enquiry message.

* * * * *